(12) United States Patent
Wright et al.

(10) Patent No.: US 12,375,287 B2
(45) Date of Patent: Jul. 29, 2025

(54) ATTESTATION SERVICE FOR USE WITH A BLOCKCHAIN NETWORK

(71) Applicant: nChain Licensing AG, Zug (CH)

(72) Inventors: Craig Steven Wright, London (GB); Owen Vaughan, London (GB); Jack Owen Davies, London (GB)

(73) Assignee: nChain Licensing AG, Zug (CH)

( * ) Notice: Subject to any disclaimer, the term of this patent is extended or adjusted under 35 U.S.C. 154(b) by 295 days.

(21) Appl. No.: 17/796,618

(22) PCT Filed: Jan. 19, 2021

(86) PCT No.: PCT/IB2021/050364
§ 371 (c)(1),
(2) Date: Jul. 29, 2022

(87) PCT Pub. No.: WO2021/165755
PCT Pub. Date: Aug. 26, 2021

(65) Prior Publication Data
US 2023/0066711 A1 Mar. 2, 2023

(30) Foreign Application Priority Data
Feb. 19, 2020 (GB) ...................................... 2002311

(51) Int. Cl.
*H04L 9/32* (2006.01)
*H04L 9/00* (2022.01)

(52) U.S. Cl.
CPC .............. *H04L 9/3239* (2013.01); *H04L 9/50* (2022.05)

(58) Field of Classification Search
CPC ....... H04L 9/3239; H04L 9/50; H04L 9/3247; H04L 9/3297; H04L 9/32; G06Q 20/065
See application file for complete search history.

(56) References Cited

U.S. PATENT DOCUMENTS

| | | | |
|---|---|---|---|
| 5,991,828 | A | 11/1999 | Horie et al. |
| 6,751,673 | B2 | 6/2004 | Shaw |

(Continued)

FOREIGN PATENT DOCUMENTS

| | | | |
|---|---|---|---|
| GB | 2583766 | A | 11/2020 |
| GB | 2583767 | A | 11/2020 |

(Continued)

OTHER PUBLICATIONS

Antonopoulos A.M., "Mastering Bitcoin—Unlocking Digital Cryptocurrencies," O'Reilly, Dec. 20, 2014, 298 pages.

(Continued)

*Primary Examiner* — Christopher A Revak
(74) *Attorney, Agent, or Firm* — Messner Reeves LLP

(57) ABSTRACT

A method comprising, at an attesting node of a network: receiving a sequence of data items from one or more client nodes of the network, determining an order of the sequence of data items, and attesting to the order by: including an indication of a respective set of one or more of the data items in each of a series of blockchain transactions. Each successive transaction comprises a respective input pointing to an output of the respective preceding transaction, wherein the output of the respective preceding transaction comprises a locking script, and the input of the respective successive transaction includes an unlocking script comprising a respective signature based on a respective key in a series of keys. The respective signature in each successive transaction signs a portion of the respective successive transaction including at least the indication of the respective set of data items.

23 Claims, 9 Drawing Sheets

(56) References Cited

U.S. PATENT DOCUMENTS

| | | | |
|---|---|---|---|
| 6,975,631 B1 | 12/2005 | Kastenholz | |
| 7,194,552 B1 | 3/2007 | Schneider | |
| 7,376,716 B2 | 5/2008 | Dilley et al. | |
| 7,418,479 B2 | 8/2008 | Gupta et al. | |
| 7,554,988 B2 | 6/2009 | Zhang et al. | |
| 7,613,796 B2 | 11/2009 | Harvey et al. | |
| 8,233,489 B2 | 7/2012 | Welin et al. | |
| 8,913,525 B2 | 12/2014 | Welin et al. | |
| 9,537,747 B2 | 1/2017 | Karenos | |
| 10,630,769 B2 | 4/2020 | Carter | |
| 11,108,561 B2 | 8/2021 | Wang | |
| 11,223,470 B1 | 1/2022 | Shea | |
| 11,349,736 B1 | 5/2022 | Cheng et al. | |
| 11,423,398 B1* | 8/2022 | Mullins | G06Q 20/36 |
| 11,606,190 B2* | 3/2023 | Carver | G06Q 20/065 |
| 11,716,202 B2 | 8/2023 | Wang | |
| 11,886,463 B2* | 1/2024 | Harold | H04L 9/50 |
| 12,021,924 B2 | 6/2024 | Vaughan et al. | |
| 12,033,146 B2 | 7/2024 | Chan et al. | |
| 12,034,798 B2 | 7/2024 | Vaughan et al. | |
| 12,039,528 B2 | 7/2024 | Chan et al. | |
| 12,045,830 B2 | 7/2024 | Tartan et al. | |
| 12,182,541 B2 | 12/2024 | Tartan et al. | |
| 12,206,790 B2 | 1/2025 | Wright et al. | |
| 12,231,573 B2 | 2/2025 | Wright et al. | |
| 12,231,574 B2 | 2/2025 | Wright et al. | |
| 12,238,222 B2 | 2/2025 | Wright et al. | |
| 2003/0212771 A1 | 11/2003 | Kwon et al. | |
| 2007/0168512 A1 | 7/2007 | Gupta et al. | |
| 2014/0153383 A1 | 6/2014 | Mabilleau et al. | |
| 2015/0117267 A1 | 4/2015 | Lih et al. | |
| 2019/0171849 A1 | 6/2019 | Assenmacher | |
| 2019/0199787 A1 | 6/2019 | Carver et al. | |
| 2019/0243572 A1 | 8/2019 | Kursun | |
| 2020/0151165 A1 | 5/2020 | Chan et al. | |
| 2020/0151713 A1 | 5/2020 | Chan et al. | |
| 2020/0151714 A1 | 5/2020 | Chan et al. | |
| 2020/0186568 A1* | 6/2020 | Erb | H04L 9/0841 |
| 2021/0182895 A1* | 6/2021 | Sears | G06Q 20/367 |
| 2021/0349443 A1* | 11/2021 | Falk | G06F 21/64 |
| 2021/0359860 A1 | 11/2021 | Wang | |
| 2021/0399898 A1 | 12/2021 | Wright et al. | |
| 2022/0027491 A1 | 1/2022 | Wright et al. | |
| 2022/0027492 A1 | 1/2022 | Wright et al. | |
| 2022/0027903 A1 | 1/2022 | Wright et al. | |
| 2022/0027905 A1 | 1/2022 | Wright et al. | |
| 2022/0029817 A1 | 1/2022 | Wright et al. | |
| 2022/0209962 A1* | 6/2022 | Tarnow | H04L 9/3066 |
| 2022/0261805 A1 | 8/2022 | Tartan et al. | |
| 2022/0269810 A1 | 8/2022 | Tartan et al. | |
| 2022/0294608 A1 | 9/2022 | Wright et al. | |
| 2022/0294652 A1 | 9/2022 | Wright et al. | |
| 2022/0300257 A1 | 9/2022 | Tartan et al. | |
| 2023/0060559 A1 | 3/2023 | Wright et al. | |
| 2023/0072531 A1 | 3/2023 | Vaughan et al. | |
| 2024/0202703 A1* | 6/2024 | Brogliato | G06Q 20/36 |

FOREIGN PATENT DOCUMENTS

| | | | |
|---|---|---|---|
| GB | 2583770 A | | 11/2020 |
| JP | 2004030610 A | | 1/2004 |
| JP | 2008040718 A | | 2/2008 |
| JP | 2009175889 A | | 8/2009 |
| JP | 2011526712 A | | 10/2011 |
| JP | 2012105265 A | | 5/2012 |
| JP | 2017055305 A | | 3/2017 |
| JP | 2018533320 A | | 11/2018 |
| WO | 2018078584 A1 | | 5/2018 |
| WO | 2018212756 A1 | | 11/2018 |
| WO | 2018215947 A1 | | 11/2018 |
| WO | WO-2019116184 A1 * | | 6/2019 ............. G06F 21/64 |
| WO | 2019219631 A1 | | 11/2019 |
| WO | 2020165177 A1 | | 8/2020 |
| WO | 2020165676 A1 | | 8/2020 |
| WO | 2020165678 A1 | | 8/2020 |
| WO | 2020165679 A1 | | 8/2020 |
| WO | WO-2022118263 A1 * | | 6/2022 ......... G06Q 20/3829 |

OTHER PUBLICATIONS

Charles R. X., "R-Puzzles," Sep. 2, 2019, 3 Pages, Retrieved from the Internet: URL: https://www.youtube.com/watch?v=CqqTCsLzbEA.

Coingeek, "CoinGeek Toronto Conference 2019: Dr. Craig Wright on R-Puzzles, the Metanet, and Attestation System," Jun. 13, 2019, 4 Pages, Retrieved from the Internet: URL: https://www.youtube.com/watch?v=9EHKvNuRc0A&t=978s.

Combined Search and Examination Report under Sections 17 and 18(3) for Application No. GB2002270.3, mailed on Oct. 22, 2020, 10 pages.

Combined Search and Examination Report under Sections 17 and 18(3) for Application No. GB2002273.7, mailed on Oct. 30, 2020, 3 pages.

Franco P., "Understanding Bitcoin: Cryptography, Engineering and Economics," Wiley, Nov. 24, 2014, 238 pages.

Hearn M., "FAQ on the Payment Protocol," Bitcoin Forum, Sep. 24, 2013, retrieved from the internet: https://bitcointalk.org/index.php?topic=300809.0, 10 pages.

International Search Report and Written Opinion for International Application No. PCT/IB2020/050734, mailed on Aug. 20, 2020, 11 pages.

International Search Report and Written Opinion for International Application No. PCT/IB2021/050367, mailed on Apr. 6, 2021, 14 pages.

Nakamoto S., "Bitcoin: A Peer-to-Peer Electronic Cash System," 2009, retrieved from the internet: https://bitcoin.org/bitcoin.pdf, 9 pages.

Nguyen S., "A View of Plasma Cash for Ethereum," FiNC Tech Blog, retrieved from the internet: https://medium.com/finc-engineering/a-view-of-plasma-cash-for-ethereum-b608b934ec67, Sep. 14, 2018, 14 pages.

Reed S.L., "Bitcoin Cooperative Proof-of-Stake," May 21, 2014, 16 pages, Retrieved from the Internet: URL: https://arxiv.org/ftp/arxiv/papers/1405/1405.5741.pdf.

Adams C., et al., "Internet X.509 Public Key Infrastructure," Time-Stamp Protocol (TSP), Network Working Group, Aug. 2001, pp. 1-26.

"ADSS TSA Server System Requirements," Key Points, Ascertia, 2020, 3 pages, Retrieved from the Internet: URL: https://www.ascertia.com/products/adss-tsa-server/key-points/, on Feb. 18, 2020.

Banton C.,"Underwriter," Investopedia, Retrieved from the Internet: URL:https://www.investopedia.com/terms/u/underwriter.asp, on Feb. 18, 2020, 10 pages.

Chen J.,"Bond Purchase Agreement," Investopedia, Retrieved from the Internet: URL:https://www.investopedia.com/terms/b/bond-purchase-agreement.asp, on Feb. 18, 2020, 9 pages.

Chen J.,"Bond Trustee," Investopedia, Retrieved from the Internet: URL:https://www.investopedia.com/terms/b/bond-trustee.asp, on Feb. 18, 2020, 7 pages.

Chen J.,"Discount Bond," Investopedia, Retrieved from the Internet: URL:https://www.investopedia.com/terms/d/discountbond.asp, on Feb. 18, 2020, 13 pages.

Chen J.,"Primary Market," Investopedia, Retrieved from the Internet: URL:https://www.investopedia.com/terms/p/primarymarket.asp, on Feb. 18, 2020, 10 pages.

Chen J.,"Trust Indenture," Investopedia, Retrieved from the Internet: URL:https://www.investopedia.com/terms/t/trust_indenture.asp, on Feb. 18, 2020, 7 pages.

Combined Search and Examination Report under Sections 17 and 18(3) for Application No. GB2002311.5, mailed on Nov. 19, 2020, 12 pages.

Datastax., "About Repair," DSE 5.1 Architecture Guide, Retrieved from the Internet: URL:https://docs.datastax.com/en/dse/5.1/dse-arch/datastax_enterprise/dbArch/archAboutRepair.html, on Feb. 18, 2020, 1 page.

(56) References Cited

OTHER PUBLICATIONS

Datastax., "Architecture in brief," Apache Cassandra 3.X, Retrieved from the Internet: URL: https://docs.datastax.com/en/cassandra-oss/3.x/cassandra/dml/dmlClientRequestsWrite.html, on Feb. 18, 2020, 4 pages.

Datastax., "Hinted Handoff: Repair during Write path," Apache Cassandra 3.0 for DSE 5.0, Retrieved from the Internet: URL: https://docs.datastax.com/en/archived/cassandra/3.0/cassandra/operations/opsRepairNodesHintedHandoff.html?hl=handoff, on Feb. 18, 2020, 3 pages.

Datastax., "How are Read Requests Accomplished?" Apache Cassandra 3.X, Retrieved from the Internet: URL: https://docs.datastax.com/en/cassandra-oss/3.x/cassandra/dml/dmlClientRequestsRead.html, on Feb. 18, 2020, 7 pages.

Datastax., "How are Write Requests Accomplished?" Apache Cassandra 3.X, Retrieved from the Internet: URL: https://docs.datastax.com/en/cassandra-oss/3.x/cassandra/dml/dmlClientRequestsWrite.html, on Feb. 18, 2020, 2 pages.

Datastax., "How is Data Deleted?," Apache Cassandra 3.0 for DSE 5.0, Retrieved from the Internet: URL: https://docs.datastax.com/en/archived/cassandra/3.0/cassandra/dml/dmlAboutDeletes.html?hl=delete, on Feb. 18, 2020, 3 pages.

Datastax., "How is Data Maintained?," Apache Cassandra 3.X, Retrieved from the Internet: URL: https://docs.datastax.com/en/cassandra-oss/3.x/cassandra/dml/dmlHowDataMaintain.html, on Feb. 18, 2020, 10 pages.

Datastax., "How is Data Written?" Apache Cassandra 3.X, Retrieved from the Internet: URL: https://docs.datastax.com/en/cassandra-oss/3.x/cassandra/dml/dmlHowDataWritten.html, on Feb. 18, 2020, 3 pages.

Downey L.,"Fiscal Agent," Investopedia, Retrieved from the Internet: URL:https://www.investopedia.com/terms/f/fiscalagent.asp, on Feb. 18, 2020, 8 pages.

Dr Wright C.S., et al., "R-Puzzles, The Metanet, and Attestation," nChain, May 2019, 17 pages.

Filho C.I.N.S., et al., "Mandala Networks: Ultra-Small-World and Highly Sparse Graphs," Scientific Reports, Mar. 13, 2015, vol. 5, No. 9082, pp. 1-6.

Financial Pipeline, "How are bonds traded?," Financial Pipeline, Dec. 1, 2004, 11 pages, Retrieved from the Internet: URL: https://staging-finpipev4.kinsta.cloud/trading-bonds/, on Feb. 18, 2020.

Hayes A.,"Bond," Investopedia, Retrieved from the Internet: URL:https://www.investopedia.com/terms/b/bond.asp, on Feb. 18, 2020, 23 pages.

Hoogstraaten H.,"Black Tulip Report of the Investigation into the DigiNotar Certificate Authority Breach," Fox IT, Aug. 13, 2012, 102 pages.

International Search Report and Written Opinion for International Application No. PCT/IB2021/050364, mailed on May 21, 2021, 18 pages.

Kaptchuk G., et al., "Giving State to the Stateless: Augmenting Trustworthy Computation with Ledgers," International Association for Cryptologic Research, Retrieved from the Internet: URL:http://eprint.iacr.org/2017/201.pdf on Apr. 16, 2018, pp. 1-35.

Kenton W.,"Secondary Market," Investopedia, Retrieved from the Internet: URL:https://www.investopedia.com/terms/s/secondarymarket.asp, on Feb. 18, 2020, 8 pages.

Krawczyk H., et al., "HMAC: Keyed-Hashing for Message Authentication," Feb. 1997, 11 pages.

Massias H., et al., "Design of a Secure Timestamping Service with Minimal Trust Requirement," UCL Crypto Group, 1999, 8 pages.

Morah C.,"Why Are Most Bonds Traded on the Secondary Market "Over the Counter"?," Investopedia, Retrieved from the Internet: URL:https://www.investopedia.com/ask/answers/09/bond-over-the-counter.asp, on Feb. 18, 2020, 9 pages.

Murphy C. B.,"Over-The-Counter (OTC)," Investopedia, Retrieved from the Internet: URL:https://www.investopedia.com/terms/o/otc.asp, on Feb. 18, 2020, 12 pages.

Nakamoto S, "Bitcoin: A Peer-to-Peer Electronic Cash System," Oct. 31, 2008, 6 pages, Retrieved from the Internet: URL: https://nakamotoinstitute.org/bitcoin/, on Feb. 18, 2020.

"Storage Engine," Cassandra Documentation, 2020, 5 pages, Retrieved from the Internet: URL: https://cassandra.apache.org/doc/latest/architecture/storage_engine.html, on Feb. 18, 2020.

Strlen, "Hacker News," Mar. 14, 2010, 1 page, Retrieved from the Internet: URL: https://news.ycombinator.com/item?id=1191314, on Feb. 18, 2020.

"The Pros and Cons of Zero-Coupon Bonds," Financial Web, 2 pages, Retrieved from the Internet: URL: https://www.finweb.com/investing/the-pros-and-cons-of-zero-coupon-bonds.html, on Feb. 18, 2020.

Wikipedia, "Deterministic Finite Automaton," 2020, 8 pages.

Wikipedia, "Eventual Consistency," 2019, 3 pages.

Xiao Y., et al., "A Survey of Distributed Consensus Protocols for Blockchain Networks," arxiv.org, Cornell University Library, Apr. 8, 2019, 28 pages.

\* cited by examiner

| $TxID_1$ | | | |
|---|---|---|---|
| Version | 1 | Locktime | 0 |
| In-count | 1 | Out-count | 2 |
| Input list | | Output list | |
| Outpoint | Unlocking script | Value | Locking script |
| $TxID_0 \| 0$ | $<Sig_1><P_1>$ | dust | [Checksig $P_2$] |
| | | 0 | OP_FALSE OP_RETURN $<data_1>$ |

| Index | Data | Hash chain element |
|---|---|---|
| 1 | $D_1$ | $H_1 = H(D_1)$ |
| 2 | $D_2$ | $H_2 = H(D_2 \| H_1)$ |
| 3 | $D_3$ | $H_3 = H(D_3 \| H_2)$ |
| | | ⋮ |
| $n_1$ | $D_{n_1}$ | $H_{n_1} = H(D_{n_1} \| H_{n_1 - 1})$ |

Figure 10

| Index | Data | Public key | Signature |
|---|---|---|---|
| 1 | $D_1$ | $P_{11} = P_1 + H(D_1) \cdot G$ | $\text{Sig}(P_{11}, H(D_1))$ |
| 2 | $D_2$ | $P_{12} = P_1 + H(D_2 \| P_{11}) \cdot G$ | $\text{Sig}(P_{12}, H(D_2))$ |
| 3 | $D_3$ | $P_{13} = P_1 + H(D_3 \| P_{12}) \cdot G$ | $\text{Sig}(P_{13}, H(D_3))$ |
| | | $\vdots$ | |
| $n_1$ | $D_{n_1}$ | $P_{1n_1} = P_1 + H(D_{n_1} \| P_{1(n_1-1)}) \cdot G$ | $\text{Sig}(P_{1n_1}, H(D_{n_1}))$ |

Figure 11

| Index | Data | Ephemeral key | Signature |
|---|---|---|---|
| 1 | $D_1$ | $R_{11} = R_1 + H(D_1) \cdot G$ | $<S_1, R_{11}>(H(D_1))$ |
| 2 | $D_2$ | $R_{12} = R_1 + H(D_2 \| R_{11}) \cdot G$ | $<S_1, R_{12}>(H(D_2))$ |
| 3 | $D_3$ | $R_{13} = R_1 + H(D_3 \| R_{12}) \cdot G$ | $<S_1, R_{13}>(H(D_3))$ |
| | | $\vdots$ | |
| $n_1$ | $D_{n_1}$ | $R_{1n_1} = R_1 + H(D_{n_1} \| R_{1(n_1-1)}) \cdot G$ | $<S_1, R_{1n_1}>(H(D_{n_1}))$ |

ATTESTATION SERVICE FOR USE WITH A BLOCKCHAIN NETWORK

CROSS REFERENCE TO RELATED APPLICATIONS

This application is the U.S. National Stage of International Application No. PCT/IB2021/050364, filed on Jan. 19, 2021, which claims the benefit of United Kingdom Patent Application No. 2002311.5, filed on Feb. 19, 2020, the contents of which are incorporated herein by reference in their entireties.

TECHNICAL FIELD

The present disclosure relates to an attestation service for use with a blockchain network, where the blockchain network propagates and mines transactions for recordal on a blockchain.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks. New blocks are created by a process known as "mining", which involves each of a plurality of mining nodes competing to perform "proof-of-work", i.e. solving a cryptographic puzzle based on a pool of the pending transactions waiting to be included in blocks.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, then the transaction (including any user data) will thus remain stored at each of the nodes in the P2P network as an immutable public record.

The miner who successfully solved the proof-of-work puzzle to create the latest block is typically rewarded with a new transaction called a "generation transaction" which generates a new amount of the digital asset. The proof-of work incentivizes miners not to cheat the system by including double-spending transactions in their blocks, since it requires a large amount of compute resource to mine a block, and a block that includes an attempt to double spend is likely not be accepted by other nodes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the P2P network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it nor include it for mining into a block to be recorded in the blockchain.

Conventionally the transactions in the blockchain are used to convey a digital asset, i.e. a number of digital tokens. However, a blockchain can also be exploited in order to superimpose additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

SUMMARY

It is recognized herein that it may be beneficial to determine and record a definitive order associated with certain items of data to be recorded on a blockchain. For instance, consider a use case where a database application or the like is to be implemented over the blockchain. In this case, each data item to be recorded on the chain may represent a change of state to an entry in the database, or such like. However changes may not be commutative, i.e. order matters. E.g. resetting a previous value to zero and then adding a value is not the same as adding and then resetting. If data items are being propagated between different nodes before being mined into blocks, it may be important for certain applications that a definitive order of the data items is properly captured.

According to one aspect disclosed herein, there is provided a method of attesting to an order of a sequence of data items. The method comprises, at an attesting node of a network: receiving the sequence of data items from one or more client nodes of the network; determining an order of the sequence of data items, whereby each successive data item in said sequence succeeds a preceding one of the data items in the sequence; and based on said determination, attesting to the order. The attesting is performed by: including an indication of a respective set of one or more of the data items in each of a series of blockchain transactions, each successive transaction in said series succeeding a respective preceding transaction in the series, wherein the set indicated in each successive transaction succeeds the set indicated in the respective preceding transaction according to said order. Each successive transaction comprises a respective input pointing to an output of the respective preceding transaction, wherein the output of the respective preceding transaction comprises a locking script, and the input of the respective successive transaction includes an unlocking script comprising a respective signature based on a respective key in a series of keys, the inclusion of the respective signature being a condition for unlocking the unlocking script of the respective preceding transaction. The respective signature in each successive transaction signs a portion of the respective successive transaction including at least the indication of the respective set of data items. The step of attesting to the order further comprises sending the transactions to be recorded on a blockchain.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 8 is a schematic transaction diagram of an example transaction for recording an order of data items on a blockchain, FIG. 9 schematically illustrates an example indexed list for recording an order of a set of data items within a transaction, FIG. 10 schematically illustrates another example of an indexed list for recording an order of a set of data items within a transaction, and FIG. 11 schematically illustrates another example of an indexed list for recording an order of a set of data items within a transaction.

DETAILED DESCRIPTION OF EMBODIMENTS

Example System Overview

Figure 1:
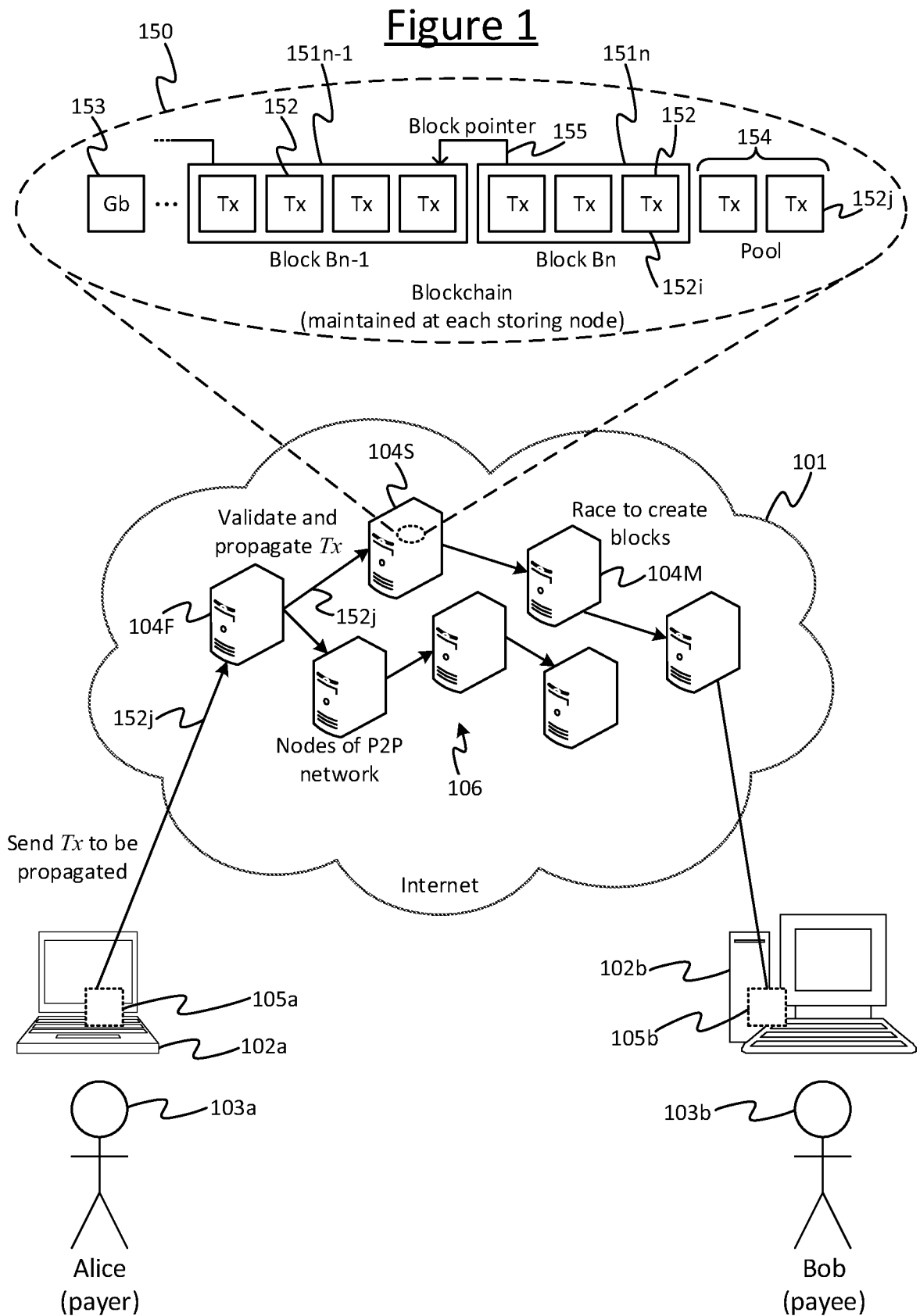
FIG. 1 is a schematic block diagram of a system for implementing a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 of the blockchain network 106 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the pool 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the signature of the user 103*a* to whom the output of the preceding transaction 152*i* is locked. In turn, the output of the present transaction 152*j* can be cryptographically locked to a new user 103*b*. The present transaction 152*j* can thus transfer the amount defined in the input of the preceding transaction 152*i* to the new user 103*b* as defined in the output of the present transaction 152*j*. In some cases a transaction 152 may have multiple outputs to split the input amount between multiple users (one of whom could be the original user 103*a* in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

When a user 103 wishes to enact a new transaction 152$j$, then he/she sends the new transaction from his/her computer terminal 102 to one of the nodes 104 of the P2P validation network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152$j$ matches the expected signature, which depends on the previous transaction 152$i$ in an ordered sequence of transactions 152. In an output-based case, this may comprise checking that the cryptographic signature of the user included in the input of the new transaction 152$j$ matches a condition defined in the output of the preceding transaction 152$i$ which the new transaction spends, wherein this condition typically comprises at least checking that the cryptographic signature in the input of the new transaction 152$j$ unlocks the output of the previous transaction 152$i$ to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152$j$ is valid, the current node forwards it to one or more others of the nodes 104 in the P2P network 106. At least some of these nodes 104 also act as forwarding nodes 104F, applying the same test according to the same node protocol, and so forward the new transaction 152$j$ on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152$j$ according to the node protocol. Another condition for a transaction to be valid is that the output of the preceding transaction 152$i$ which it attempts to spend or redeem has not already been spent/redeemed by another valid transaction. Again if not valid, the transaction 152$j$ will not be propagated or recorded in the blockchain. This guards against double-spending whereby the spender tries to spend the output of the same transaction more than once.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151$n$ pointing back to the previously created block 151$n$-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

The pool 154 is sometimes referred to as a "mempool". This term herein is not intended to limit to any particular blockchain, protocol or model. It refers to the pool of transactions which a miner has accepted for mining and for which the miner has committed not to accept any other transactions attempting to spend the same output.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151$n$, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151$n$. This reward gives an incentive for the miners 104M to participate in the proof-of-work race. Often a regular (non-generation) transaction 152 will also specify an additional transaction fee in one of its outputs, to further reward the winning miner 104M that created the block 151n in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. The node software may be implemented in one or more applications at the application layer, or a lower layer such as the operating system layer or a protocol layer, or any combination of these. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152j, it handles it in accordance with the node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any storage node 104S that receives the transaction 152j will add the new validated transaction 152 to the pool 154 in the copy of the blockchain 150 maintained at that node 104S. Further, any forwarding node 104F that receives the transaction 152j will propagate the validated transaction 152 onward to one or more other nodes 104 in the P2P network 106. Since each forwarding node 104F applies the same protocol, then assuming the transaction 152j is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different nodes 104 may receive different instances of a given transaction first and therefore have conflicting views of which instance is 'valid' before one instance is mined into a block 151, at which point all nodes 104 agree that the mined instance is the only valid instance. If a node 104 accepts one instance as valid, and then discovers that a second instance has been recorded in the blockchain 150 then that node 104 must accept this and will discard (i.e. treat as invalid) the unmined instance which it had initially accepted.

UTXO-Based Model

Figure 2:
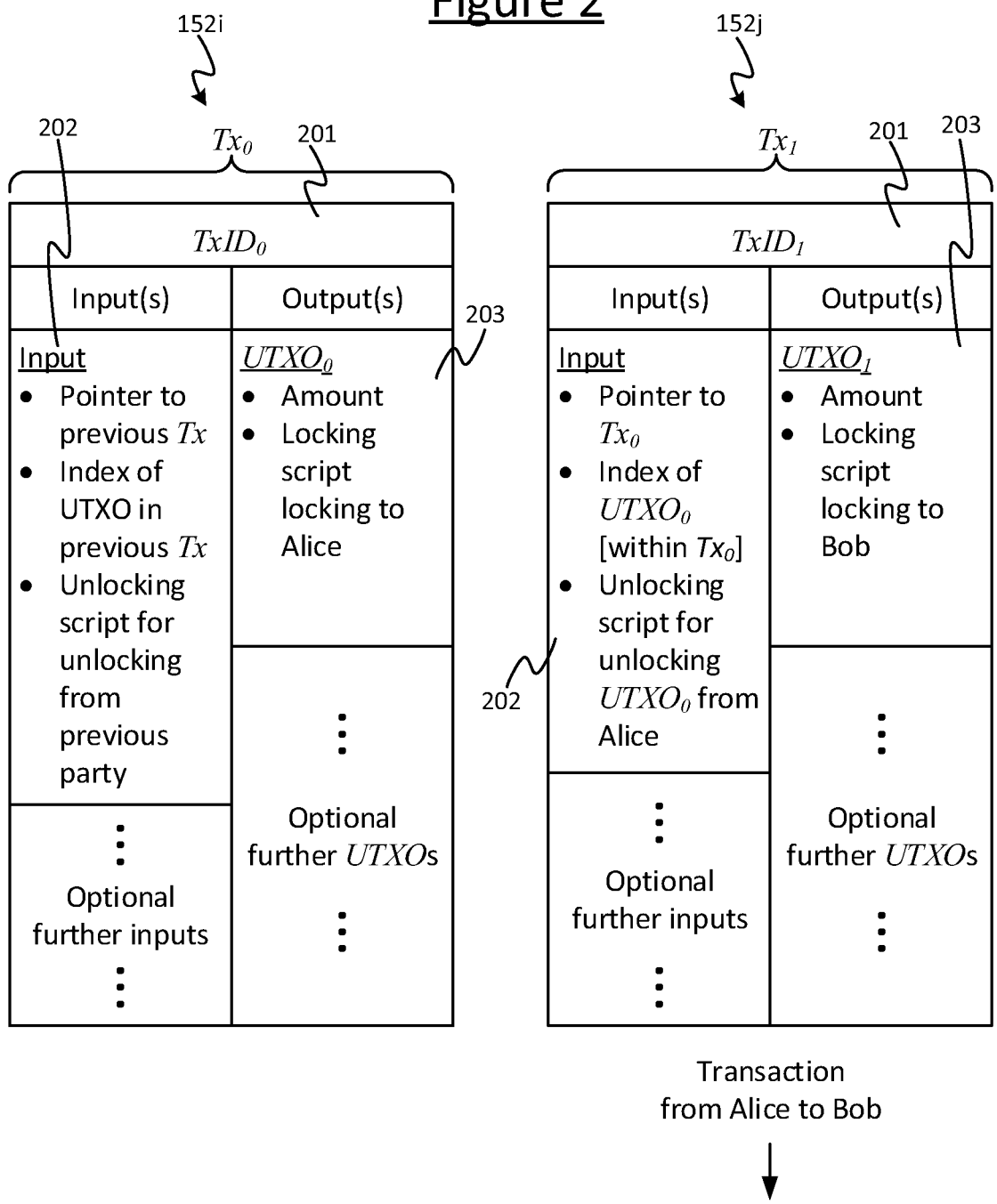
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the (distributed) ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

Depending on implementation, the signature required may for example be a conventional ECDSA (elliptic curve digital signature algorithm) signature, DSA (Digital Signature Algorithm) signature or RSA (Rivest-Shamir-Adleman) signature, or any other suitable form of cryptographic signature. The challenge for the signature may for example be implemented as a standard pay-to-public key (P2PK) puzzle or P2PK hash (P2PKH) puzzle, or an alternative such as an R-puzzle may instead be implemented as a means to a signature. The present example uses P2PK by way of illustration.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$> <$P_A$>||[Checksig $P_A$]

where "||" represents a concatenation and "< ... >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

A hash referred to anywhere herein may refer for example be implemented by a SHA (Secure Hash Algorithm) hash function, or HMAC (hash-based message authentication code) hash function, or any other suitable form of cryptographic hash function known in the art.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor mined into blocks 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any difference between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160 <H($P_A$)>OP_EQUALVERIFY OP_CHECKSIG. "OP_. . . ." refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Layered Network

Layered Network Structure: A layered network is an overlay network layered on top of a communication channel. For instance, the communication channel may be an underlying infrastructure network such as a personal area network, a local area network (e.g. an inter-company P2P network) or a wide area network such as the internet. In other examples, the layered network may be a network of nodes connected via wired connections. In yet other examples, the connections may be wireless connections, e.g. Bluetooth or Wi-Fi connections. In some examples, some or all of the above example connections may be used to form the layered network.

Some or all of the nodes are the network are configured to connect to (i.e. join or re-join) the layered network according a connection protocol. The connection protocol may vary according to the particular layer of the network in which the connecting node is connecting to (i.e. attempting to join or re-join). Before the connection protocol is described in detail, a series of example layered networks that may be created, or enforced, by the connection protocol will be described. However it will be appreciated that these are only illustrative examples, and in general any layered network that obeys the connection protocol may be created.

Figure 3:
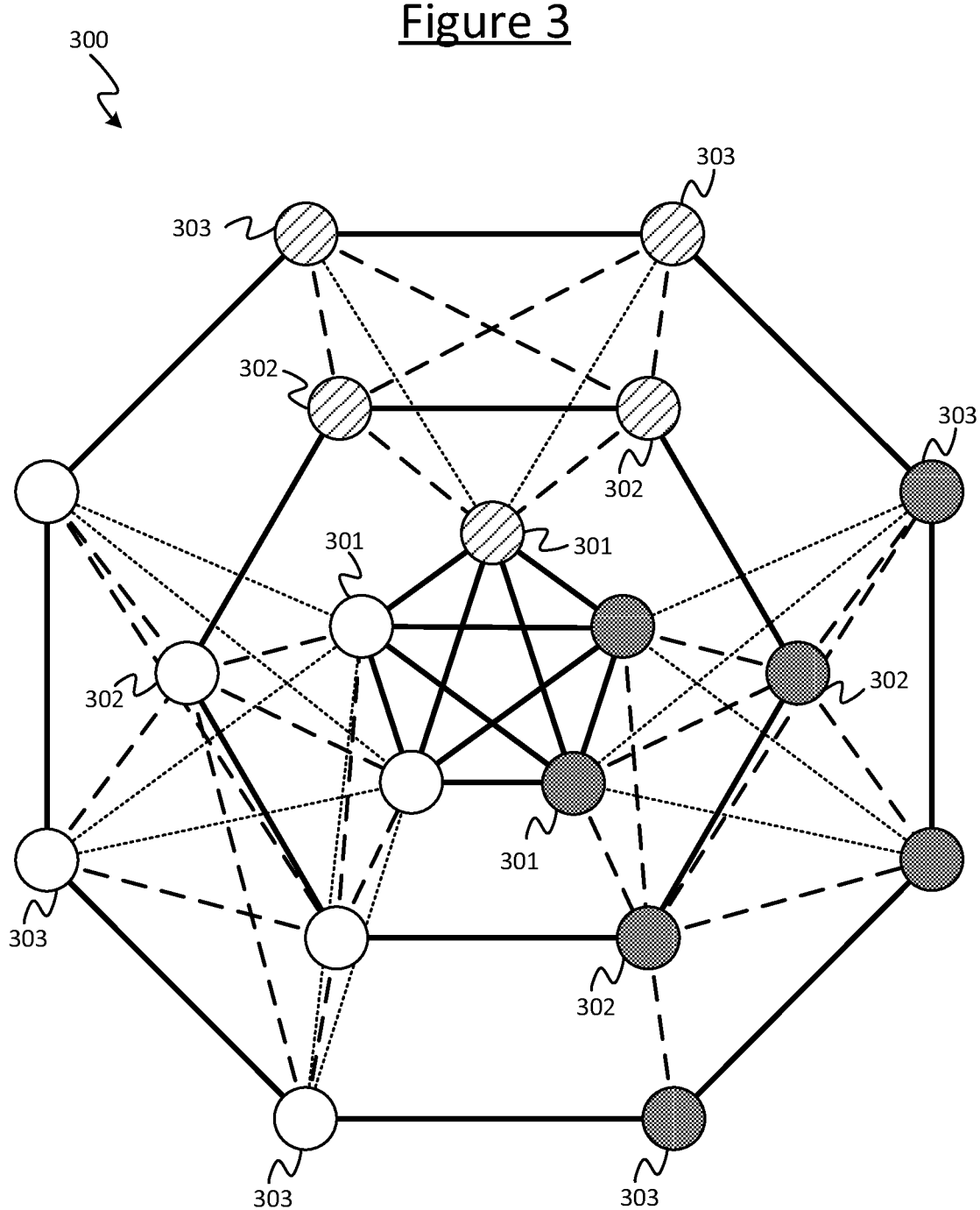
FIG. 3 is a schematic representation of an example of a layered network.
Figure 5:
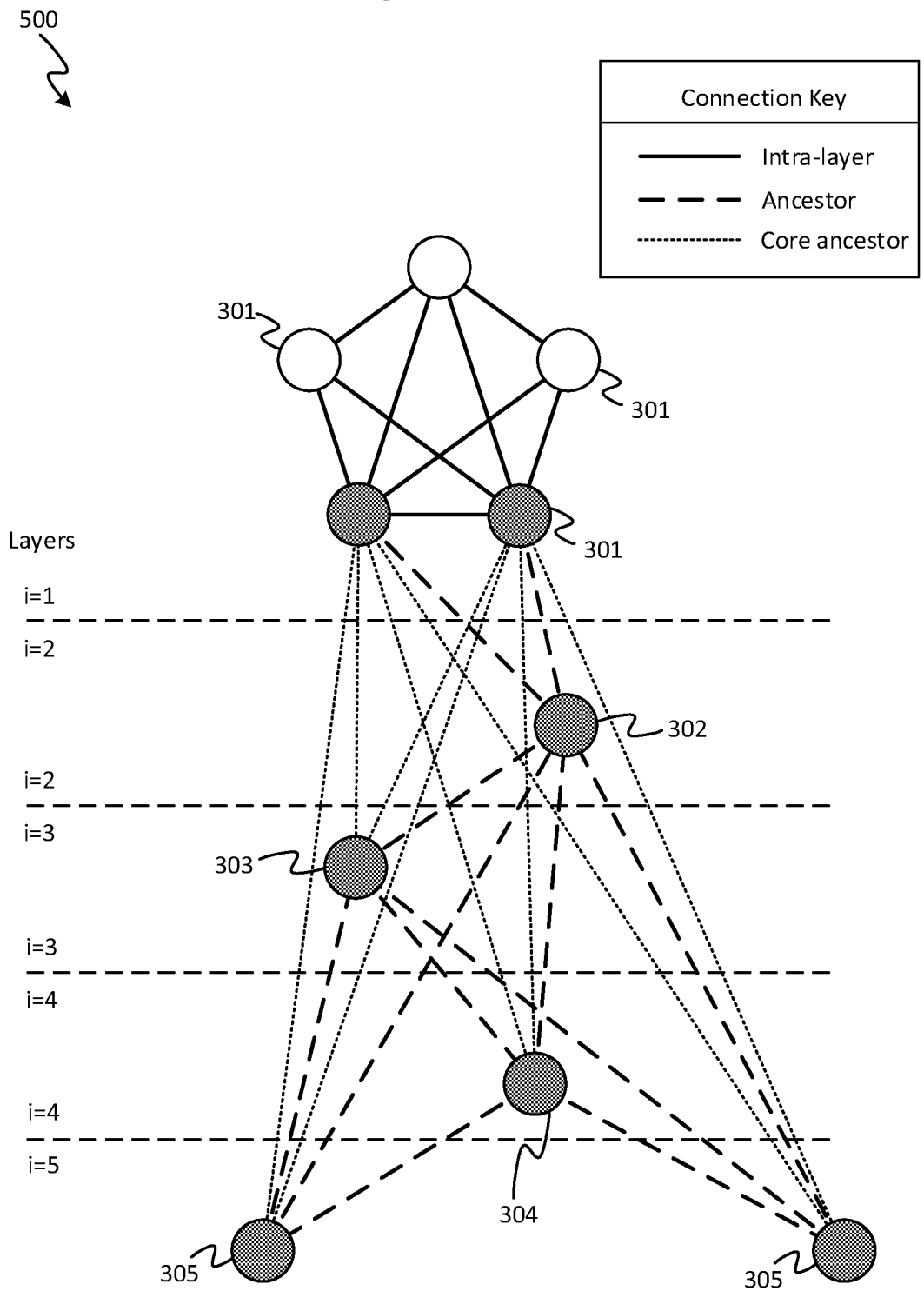
FIG. 5 is another schematic representation of an example of a layered.
Figure 6:
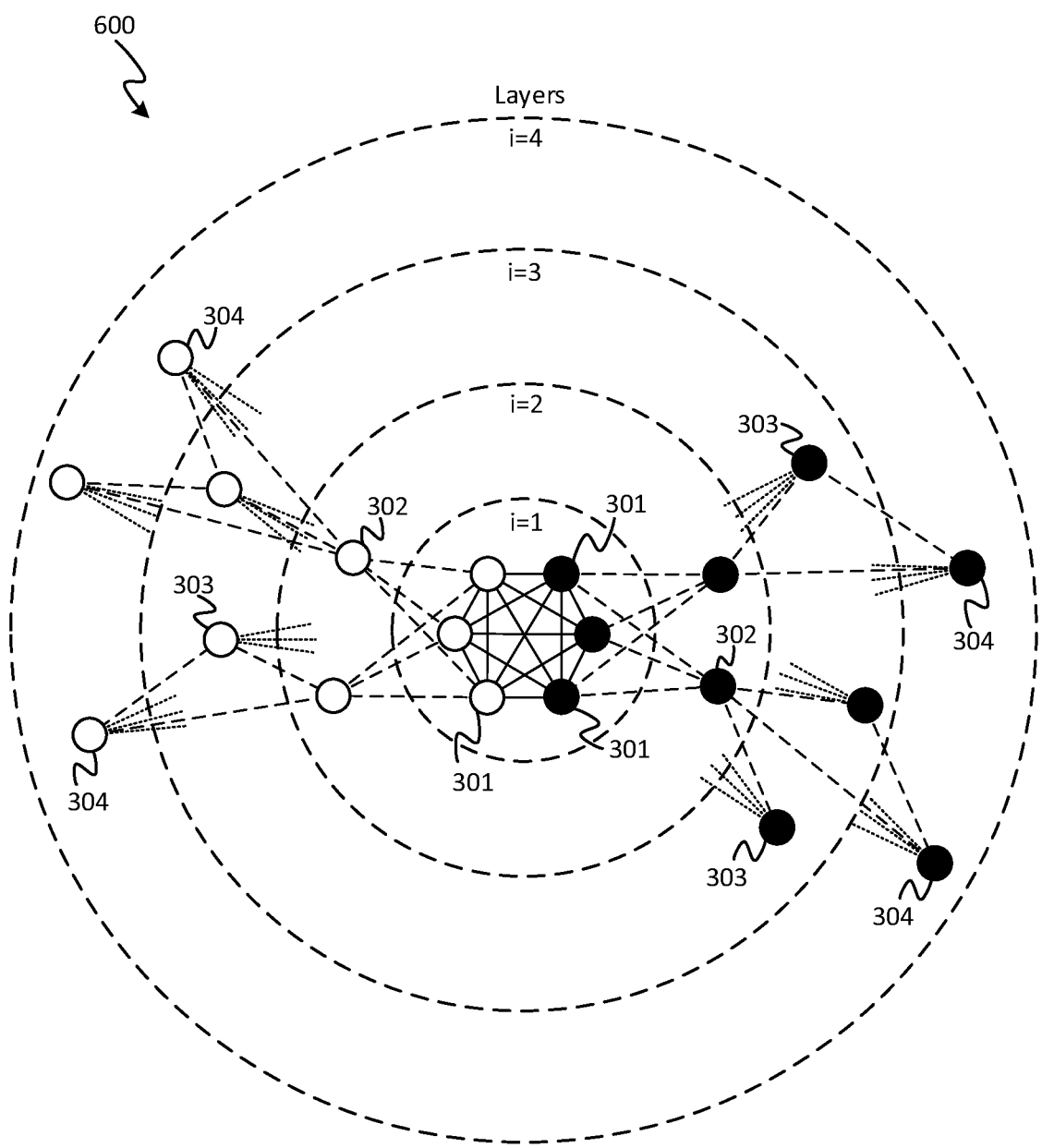
FIG. 6 is another schematic representation of an example of a layered network, FIG. 7 schematically illustrates an example attestation service implemented in a layered network.

FIG. 3 illustrates a schematic representation of an example of a layered network (LN) 300. In general, a LN includes a core network (or core layer) made up of core nodes 301, and a series of layers (or shells). The core layer is also referred to as the first layer of the LN. The series of layers extend outward of the core layer, in order, from a second layer made up of second nodes 302, to one or more outer layers. Each outer layer is made up of a set of outer nodes 303. Only one outer layer is shown in FIG. 3 but it will be appreciated that a LN may comprise any number of outer layers. As a particular example, FIG. 5 illustrates an example of a LN 500 comprising five layers, and FIG. 6 illustrates an example of a LN 600 comprising four layers.

The example LN 300 of FIG. 3 comprises five core nodes 301, six second nodes 302 and eight outer nodes 303. In some LNs 300, the number of nodes may increase with each layer, i.e. the core layer is made up of the least number of nodes and the outermost layer is made up of the greatest number of nodes. In other examples, one or more of the layers between the core layer and outermost layer may be made up of the greatest number of nodes. In this example, the core layer is the innermost layer of the LN 300, the second layer is an intermediate layer and the outer layer, being the only outer layer, is the outermost layer.

The core layer (a network within the LN) in this example forms a complete graph, i.e. each core node 301 is connected to each other core node 301. For a core layer of five core nodes 301, in the example given the core layer requires ten distinct core connections (i.e. a connection between two core nodes). In other examples (e.g. FIG. 4), the core layer may not be a complete graph. The core layer may form a "near-complete graph". In a near-complete graph, at least one core node 301 is not connected to at least one other core node 301. It may be that only one core connection is missing. In a particular example of a near-complete graph, each core node 301 may be connected to one or more but not all of the other core nodes 301.

The second layer comprises second nodes 302. Note that the term "second node" is used only as a label for nodes 302 that are situated, by construction, in the second layer of the LN 300. Each second node 302 is connected to at least one core node 301. In some examples, each second node 302 may be connected to only one core node 301. Alternatively, some or all of the second nodes 302 may be connected to more than one core node 301. For instance, some or all of the second nodes 302 may connect to each and every one of the core nodes 301. In the example LN 300 of FIG. 3, each core node 301 is connected to two second nodes 302. However, in this example, some second nodes 302 (those shown as striped circles) are connected to one core node 301, whilst some second nodes 302 (those shown as white circles, and those shown as shaded circles) are connected to two core nodes 301. Second nodes 302 (and outer nodes 303 of outer layers) that are connected to the same core nodes 301 are referred to as a "community". For instance, each white node together forms one community, each striped node together forms a community, and each shaded node together forms yet another community. Connections between the second nodes 302 and the core nodes 301 are referred to as "ancestor connections" and are shown as wide dotted lines.

In the example of FIG. 3, each second node 302 is connected to two other second nodes 302. In some examples, some or all of the second nodes 302 may not form connections with other second nodes, e.g. some second nodes 302 may be connected to other second nodes 302 whilst some second nodes may be connected to other second nodes 302. These "intra-layer" connections are shown as solid lines between nodes in FIG. 3.

The outer layer of FIG. 3 comprises outer nodes 303. Note that the term "outer" in "outer layer" here does not in itself necessarily limit to the outermost layer of the LN network as a whole, though that is one possibility. Each outer node 303 is connected to at least one second node 302. In some examples, each outer node 303 may be connected to only one second node 302. Alternatively, some or all of the outer nodes 303 may be connected to more than one second node 302. For instance, some or all of the outer nodes 303 may connect to each and every one of the second nodes 301. In the example LN 300 of FIG. 3, each outer node 303 is connected to two second nodes 302. Some second nodes 302 (i.e. the striped nodes) are connected to two outer nodes 303, and some second nodes 302 (i.e. the white nodes and shaded nodes) are connected to three outer nodes 303.

In the example of FIG. 3, each outer node 303 is connected to two other outer nodes 303 of the same layer. In some examples, some or all of the outer nodes 303 may not form any connections with other outer nodes 303 of the same layer. Some or all of the outer nodes 303 may form at least one connection with another outer node 303 of the same layer.

As well as being connected to at least one second node 302, each outer node 303 is also connected to at least one core node 301. A connection between an outer node 303 and a core node 301 is referred to as a "core ancestor connection" and is shown as a thin dotted lines. Each outer node 303 may be connected to each of the core nodes 301 that their ancestral second node(s) 302 is/are connected to. As shown in FIG. 3, each outer node 303 may be connected to each of the core nodes 301 that their ancestral second node(s) 302 is/are connected to, and to no other core nodes 301. In this case, each outer node 303 belongs to a single community.

Figure 4:
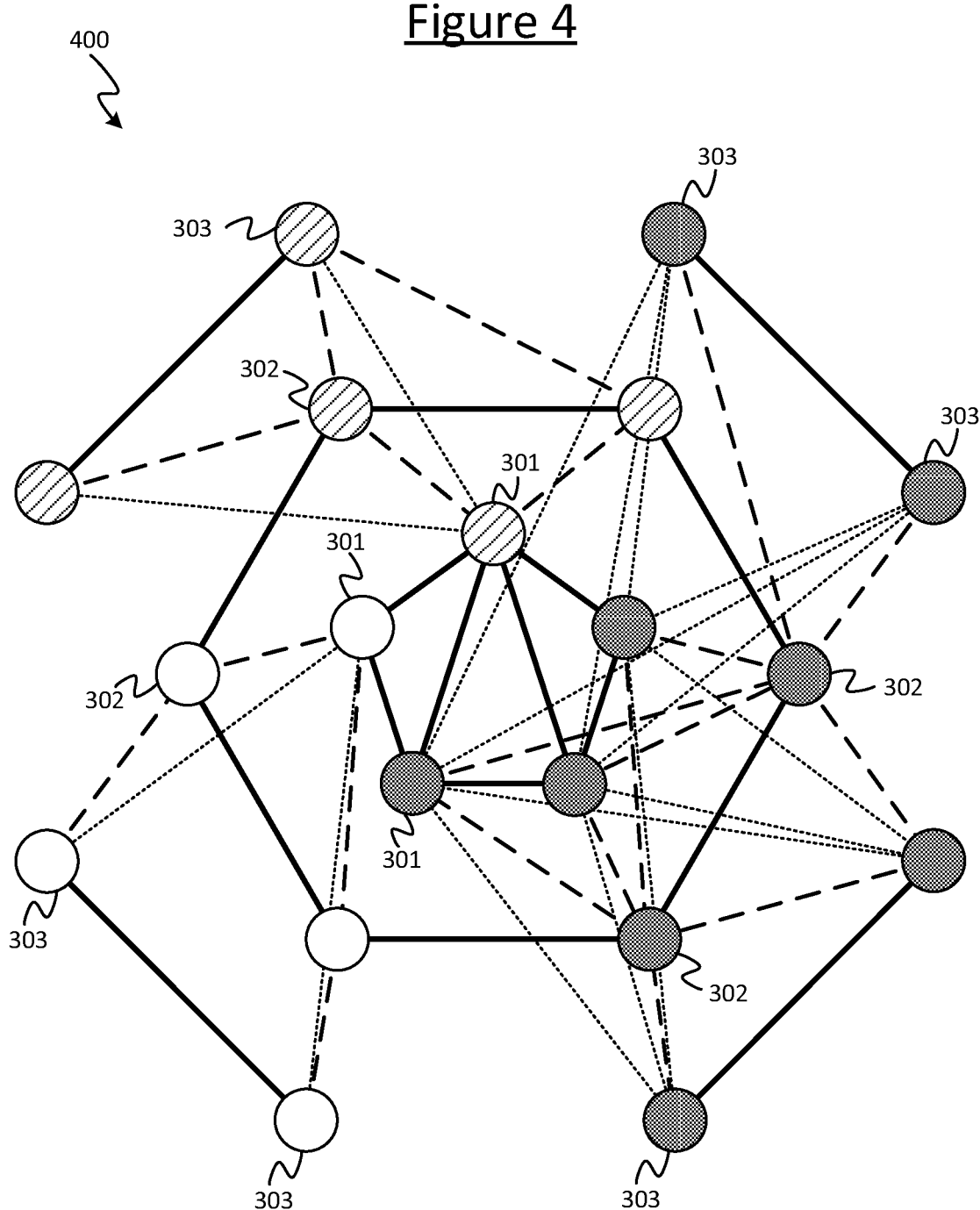
FIG. 4 is another schematic representation of an example of a layered network.

FIG. 4 illustrates a schematic representation of another example of a LN 400. Like the LN 300 of FIG. 3, the example LN 400 comprises a core layer, a second layer and an outer layer. These example LNs 300, 400 share the same number of nodes (i.e. five core nodes 301, six second nodes 302 and eight outer nodes 303), but include a different number of connections. For instance, in this example the core layer is not a complete graph as some connections between core nodes 301 are not present. Another difference is that two communities (white nodes and shaded nodes) comprise a single core node 301, whilst another community (shaded nodes) comprises three core nodes 301. Yet another difference is that the degree of nodes in the outer shell of LN 400 is now one, unlike the degree of nodes in the outer shell of LN 300 which is two. That is, in this example LN 400, each outer node 303 is connected to a single other outer node 303. Therefore the nodes of different layers have a different degree.

FIG. 5 illustrates a schematic representation of another example of a LN 500. In this example, only some core nodes 301 are connected to second nodes and outer nodes 303. That is, in this example some core nodes 301 only form connections with other core nodes 301. Therefore in this example the LN 500 comprises a single community (shaded nodes). The LN 500 of his example comprises five layers: a core layer, a second layer, and three outer layers. The core layer is made up of five core nodes 301 that form a near-complete graph. In this example of a near-complete graph, only a single core connection is missing. The second layer is made up of a single second node 302 which is connected to two core nodes 301. The second layer is made up of a single second node 302 which is connected to two core nodes 301. The third layer is made up of a single outer node 303 which is connected to the second node 302 via an ancestor connection. The outer node 303 of the third layer is also connected to the two core nodes 301 that the second node 302 is connected to. The outer node 303 is connected to the two core nodes 301 via respective core ancestor connections. The fourth layer is also made up of a single outer node 304. The outer node 304 of the fourth layer is connected to the outer node 303 of the third layer, via an ancestor connection, and to the second node 302, via an ancestor connection. The outer node 304 of the fourth layer is also connected to the two core nodes 301 that the second node 302 and the outer node 303 of the third layer are connected to. The outer node 304 is connected to the two core nodes 301 via respective core ancestor connections. Finally, the fifth layer is made up of two outer nodes 305. The two outer nodes 305 of the fifth layer are connected to the outer node 304 of the fourth layer, and to the outer node 303 of the third layer, and to the second node 302, wherein each connection is an ancestor connection. The two outer nodes 305 are also connected to the two core nodes 301 via core ancestor connections. In this example LN 500, the node of the second layer and the nodes of the outer layers are not connected to any other nodes of the same layer.

FIG. 6 illustrates a schematic representation of another example of a LN 600. This LN comprises two communities of nodes, as illustrated by the white nodes and the black nodes. In this example the core layer forms a complete graph (i.e. network of nodes). Each community comprises a distinct set of three core nodes 301. This example LN 600 comprises four layers (a core layer, a second layer and two outer layers). Each node of an outer layer is connected to one node in a preceding layer. Like the example LN 500 of FIG. 5, the nodes of the second layer and the nodes of the outer layers are not connected to any other nodes of the same layer.

In some embodiments, the LN 300, 400, 500, 600 (denoted by "300" from now on for brevity) may be a "blockchain layered network (BLN)". The term BLN is defined herein as a layered network that comprises a blockchain network, or at least part of a blockchain network, e.g. the blockchain network 106 described with reference to FIG. 1.

BLNs are inspired by Mandala networks and share some similar features but are designed to allow more flexible and desirable connectivity structures, e.g. for service and user networks that utilize the blockchain network 106.

A BLN 300 may comprises at least part of a blockchain network 106 at its core. In general, the nodes of the layered network are overlaid on an underlying infrastructure network such as the internet 101. Some or all of the core nodes are nodes 104 of the blockchain network 106. They may comprise mining nodes 104M, storage nodes 104S, or a combination thereof. In embodiments each of the core nodes is a mining node 104M and/or storage node 104S (e.g. full copy node).

Each of the outer nodes 303 (or each of the outer nodes of the outermost layer) may be an end-user node, comprising the computer equipment of a user. This could be an individual user or an organization such as a company, academic institution, or government institution, etc. Hence each outer node 303 may comprise one or more user terminals and/or a server comprising one or more server units at one or more sites. Each outer node 303 comprises memory comprising one or more memory units, and processing apparatus comprising one or more processing units. These may for example take any of the forms of memory medium and/or processor as those discussed previously in relation to other network elements or user equipment. The memory stores client software arranged to run on the processing apparatus, wherein the client software is configured so as when run to operate the node as a client of a protocol that obeys the connection protocol in accordance with any of the following embodiments or similar. Optionally, one or more of the end-user nodes may comprise the user equipment 103 of a user 102 of the blockchain network 106, and the client software may comprise a blockchain wallet application 105 or the like.

Each second node 302 may take the form of a server comprising one or more physical server units. Each such node comprises memory comprising one or more memory units and processing apparatus comprising one or more processing units. These may for example take any of the forms of memory medium and/or processor as those discussed previously in relation to other network elements. The memory stores software arranged to run on the processing apparatus of the second node 302. This software is configured so as when run to obey the connection protocol in accordance with any of the following embodiments or similar. In some embodiments, the software is configured so as when run to provide a service that operates in accordance with any of the embodiments described below or similar.

In some examples, some or all of the second nodes 302 may operate a smart contract service. The smart contract service is configured to perform a predefined operation in response to, and based on, a blockchain transaction transmitted to the smart contract service by one of the other nodes of the LN 300, e.g. by an outer node 303. For instance, the smart contract may transmit a blockchain transaction to a core node 301 in response to receiving a particular blockchain transaction from an outer node 303.

In other examples, some or all of the second nodes 302 may operate, amongst them, a distributed database. That is, each second node 302 that operates the distributed database is configured to store data received from another node of the LN 300, e.g. an outer node 303. The second node 302 that receives and stores data may be configured to propagate the data to other second nodes 302 that are also operating the distributed database.

The nodes 301, 302, 303 are configured to form connections between one another at the overlay network level. That is, the nodes 301, 302, 303 of the layered network are configured to obey an overlay network protocol which specifies what connections they can and cannot form with other nodes 301, 302, 303 of the layered network. Hence, although all the nodes may be (but not necessarily) physically capable of connecting to one another via the underlying infrastructure (e.g. the internet), when they are participating as nodes 301, 302, 303 of the layered network, operating in accordance with the relevant overlay network protocol of the layered network 300, then the connections between such nodes 301, 302, 303 may be more limited. A connection between two nodes 301, 302, 303 of the layered network 300 means those nodes can communicate directly, which in this context means without having to perform a hop via another node 301, 302, 303 of the layered network 300. In the context of an overlay network such as the layered network, a "connection" means a connection (i.e. edge) at the level of the layered network 300 (i.e. the level of the overlay network protocol of the layered network).

In embodiments where the LN 300 is a BLN, some or all of the second nodes 302 may be configured to transmit blockchain transactions to the core nodes 301 that those second nodes 302 are connected to. In some examples, a second node 302 may generate a blockchain transaction before transmitting it to the core node(s) 301. In other examples, a second node 302 may forward the blockchain transaction to the core node(s) 301. For instance, the second node 302 may receive the blockchain transaction from an outer node 303, and then send the received blockchain transaction to the core node(s) 301. Similarly, a given second node 302 (i.e. some or all of the second nodes) may be configured to obtain blockchain transactions from the core node(s) 301 and/or outer nodes 303 that are connected to a given second node 302.

Additionally or alternatively, some or all of the outer nodes 303 may be configured to transmit blockchain transactions to the core node(s) 301 that they are connected to. The outer nodes 303 may also be configured to transmit blockchain transactions to the second node(s) 302 that they are connected to. In some examples, an outer node 303 may transmit a blockchain transaction to a second node 302 and to a core node 301.

Some or all of the outer nodes 303 may be configured to transmit a blockchain transaction to other outer nodes 303, e.g. outer nodes in the same layer, or outer nodes of the previous layer or the next layer in the ordered set of layers.

In embodiments where the core nodes 301 of the BLN 300 each perform the role of a blockchain node 104, some or all of the second nodes 302 and/or outer nodes 303 may be configured to request confirmation that a given transaction has been accepted in the pool of transactions of the mining node 104M that a given second node 302 or outer node 303 is connected to. The pool 154 (sometimes referred to as a mempool) comprises transactions that have been validated according to a set of consensus rules of the blockchain network 106. If a transaction (e.g. a "first transaction") is included in the pool 154, a mining node 104M will not accept another transaction (e.g. a "second transaction") that attempts to double spend an output referenced by an input of the first transaction. Therefore second nodes 302 and/or outer nodes 303 can query a core node 301 to check that a transaction (e.g. a transaction submitted by the node 302, 303 to the blockchain network 106) has been accepted, or check whether a transaction (e.g. a transaction received from another node of the BLN 300) is a double spend attempt. The core nodes 301 are configured to transmit the reply to the request to the requesting node 302, 303.

Additionally or alternatively, the second nodes 302 and/or the third nodes 303 may be configured to transmit a request to a core node 301 for a Merkle proof of a transaction that has been mined in a block 151 of the blockchain 150. Merkle proofs will be familiar to the skilled person. A Merkle proof is a sequence of hashes which trace back to the Merkle root. To verify whether a transaction has been mined in a block 151, a node 302, 303 takes the hash of the transaction, concatenates it with a first hash in the sequence of hashes of the Merkle proof (i.e. a hash partner at the same level of the Merkle tree as the hash of the transaction), and hashes the result. This process of concatenation and hashing is repeated until all of the hashes in the Merkle proof have been utilized. If the resulting hash is identical to the Merkle root, the transaction must be included in the Merkle tree, and therefore the block 151. The core nodes 301 are configured to transmit the Merkle proof to the requesting node 302, 303.

Additionally or alternatively, the second nodes 302 and/or the third nodes 303 may be configured to transmit a request to a core node 301 for a block header of a given block 151. Amongst other data, the block header comprises the Merkle root of the transactions mined into that block 151. The core nodes 301 are configured to transmit the Merkle proof to the requesting node 302, 303.

In some embodiments, some or all of the core nodes 301 may be configured to transmit a set of transactions to some or all of the second node(s) 302 and/or some or all of the outer node(s) that are connected to the core node 301. The transactions in the set may share a common attribute. For instance, a core node 301 may transmit all transactions that include a specific protocol flag. The flag may be included in an output of the transactions, e.g. in an unspendable output. As another example, the transactions may comprise a specific (and same) blockchain address, e.g. they may be payable to the same blockchain address. An outer node 303 may have an agreement with the core node 301 that the core node 301 will send any transactions payable to an address associated with the outer node 303. As yet another example, the transactions may comprise a secondary consensus ruleset. That is, the transaction may include, in an output, more than one control branch, each control branch being specific to a respective consensus ruleset. The output may comprise a first control branch specific to a first ruleset and a second control branch specific to a second ruleset (the two control branches may be included in an if-else condition). If the node 302, 303 is configured to implement the second ruleset, the core node 301 may transmit the transaction to the node 302, 303. If the node 302, 303 is neither configured to implement the first ruleset nor the second ruleset, the core node does not transmit the transaction to the node 302, 303.

A core node 301 that is a mining node 104M may include an identifier (e.g. a "Miner ID") specific to that mining node 104M in a generation transaction (also referred to as a "coinbase" transaction) mined into a block 151 by that mining node 104M. Other nodes of the BLN 300 may use the identifier to identify that mining node 104M on the network.

Another way of identifying nodes 301, 302, 303 of the LN 300 is by way of digital certificates. Some or all of the nodes 301, 302, 303 may be associated with a digital certificate. The digital certificate includes, and attests to, an identifier of a respective node, e.g. a public key associated with that node, a network address (e.g. an IP address) of the node, etc. A node of the LN 300 may use the digital certificate of a different node to connect to that node. For example, an outer node 303 may obtain a digital certificate from a second node 302 and use the identifying information of the second node included in the digital certificate to connect to the second node 302.

Nodes of a given layer may issue digital certificates to nodes of a next layer in the ordered set of layers, i.e. core nodes 301 may issue digital certificates to second nodes 302, second nodes 302 may issue digital certificates to outer nodes 303 of a first outer layer, and so on. In some examples, nodes of a given layer may issue digital certificates to nodes of the same layer, e.g. a second node 302 may issue a respective digital certificate to one or more other second nodes 302.

Connection Protocol: As set out above, each node connecting to the layered network 300 may connect according to a connection protocol. That is, the connecting node must obey the rules of the connection protocol. The connecting node may only form connections that are allowed by the connection protocol. No other connections may be formed. In examples, the connecting node may be a core node 301, a second node 302 or an outer node 303. In some examples, each node of the LN 300 must obey the connection protocol. In other examples, only nodes that are connecting to the LN 300 for the first time, or are re-joining the LN 300, must obey the connection protocol. FIGS. 3 to 6 illustrate example LNs 300, 400, 500, 600 that are established according to the connection protocol.

Note that, physically speaking, each of the nodes of the LN 300 may in some examples be connected or capable of connecting to one another at some other level, e.g. via the internet. The connection protocol imposes restrictions on what connections can be formed at the level of the overlay network, i.e. at the level of the layered network, some connections do not exist or are not allowed. Each connecting node of the LN 300 is configured to operate in accordance with an overlay-level protocol (which comprises the connection protocol) of the LN 300 which determines what connections the nodes can and can't form at the overlay-level. In other words a connection is an allowed communication channel which two nodes are configured to be allowed to form by their protocol. If a node has a connection with another node, then it can commutate with that node without hopping via another node of the layered network, but if it does not then it cannot and may only communicate by hopping via one or more other nodes that do have connections between them.

The connection protocol requires that the connecting node connects to at least one node of a preceding (more inner)

layer and to at least one core node, with the exception that a core node may, in some examples, be the innermost layer and so cannot connect to a preceding layer. In examples where the connecting node is a second node, these two requirements are equivalent. If the connecting node is an outer node of a first outer layer, the connecting node connects to at least a second node 302 and a core node 301.

The connection protocol may require that the connecting node connects to more than one core node. The connection protocol may further require that the connection node connects to more than one but not all of the core nodes, e.g. all but one core node. The connecting node may be a second node that must connect to two or more core nodes. That is, some or all of the second nodes must connect to two or more core nodes (and in some examples, not all of the core nodes).

The connection protocol may require that the connecting node connects to one or more second nodes. If the connecting node is a second node, this means the connecting (second) node must connect to one or more different second nodes. If the connecting node is an outer node, the connecting (outer) node must connect to one or more second nodes. The connecting outer node may be an outer node of the first outer layer, or an outer node of a second outer layer, and so on.

The connection protocol may require that an outer node that is connected to a node of a preceding layer, must connect to some or all of the core node(s) that the node of the preceding layer is connected to (referred to above as "core ancestors"). For example, an outer node may be connected to a second node. In that case, the outer node must also connect to the core node(s) that the second node is connected to. If the outer node is connected to more than one second node, the connection protocol may require that the outer node must connect to the core node(s) that each of the second nodes are connected to. As another example, an outer node of a second outer layer may be connected to an outer node of a first outer layer. In that example, the connection protocol requires that the outer node of the second outer layer must connect to the core node(s) that the outer node of the first outer layer is connected to.

The connection protocol may require that an outer node connects to one or more (e.g. two) outer nodes of the same outer layer. The connection protocol may require that each outer node connects to one or more outer nodes of the same layer. Alternatively, some outer layers may include outer nodes that form one or more same layer connections, and some outer layers may include outer nodes that do not form one or more same layer connections. The connection protocol may require that each outer node of the same outer layer must connect to the same number of different outer nodes of that layer. For example, each outer node of the first outer layer may be required to connect to two outer nodes. Each outer node of the second pouter layer may be required to connect to three outer nodes. That is, the number of outer nodes of the same layer that an outer node is connected to may vary between outer layers.

In some embodiments, an outer node of an $i^{th}$ outer layer (e.g. a third outer layer) may be connected to an outer node of a preceding $(i-1)^{th}$ layer (e.g. a second outer layer). The connection protocol may require that an outer node (e.g. all outer nodes) of a successive $(i+1)^{th}$ outer layer must connect to each node of the $(i-1)^{th}$ layer that the outer node of the $i^{th}$ outer layer is connected to. For instance the outer node 305 of the fifth layer in the LN 500 of FIG. 5 is connected to the outer node 304 of the fourth layer and to the outer node 303 of the third layer. In some examples, the connection protocol may require that the outer node of the $(i+1)^{th}$ must connect to each outer node of each preceding layer that the outer node of the $i^{th}$ outer layer is connected to.

In embodiments where some or all of the nodes of the LN 300 are associated with digital certificates, the connection protocol may require that the connecting node must only connect to nodes that are associated with nodes that are associated with a respective digital certificate. In some embodiments, the connection protocol may require that the connecting node (e.g. an outer node) must only connect to a respective node (e.g. a second node) if the digital certificate associated with the respective node has been issued by a node (e.g. a core node) of a layer preceding the respective node, or in some examples, a node (e.g. a different second node) of the same layer of the respective node.

In some embodiments, the connection protocol may require that the connecting node can only connect to nodes that have issued the connection node with a digital certificate. That is, connecting to a node comprises receiving a digital certificate from that node.

The connection protocol enables the construction of a BLN. Like a Mandala network, a BLN is built up in layers. Unlike a Mandala network, the first layer may form an incomplete graph (e.g. a near-complete graph). Other differences between a BLN and a Mandala network are that, in a BLN, nodes in each successive layer may have different degrees, nodes may be connected to more than one node in the central layer, and/or the degree of nodes may differ between layers.

Preferably, for all Nodes Outside the Central Core:
  (i) Each node is connected to m out of $n_1$ nodes in the central core.
  (ii) Each node is connected to a node in every layer, where g is the total number of layers.
  (iii) Each node is a member of exactly one community. There are at most $n_2$ communities, where $n_2$ is the number of nodes of the second layer.
  (iv) Each node is connected to every other node by at most 3 hops. This is referred to as the diameter of the graph.

In a BLN, a "community" is defined as the set of nodes that share exactly the same set of core ancestors. FIG. 6 shows a BLN with network $n_1=6$, m=3 and g=4, with the nodes of two distinct communities drawn: a black node community and a white node community.

The white node community comprises nodes which are all connected to three nodes on the LHS of the central core, while the black node community comprises nodes which are all connected to the three nodes on the RHS of the central core.

A characteristic of Mandala networks is that all nodes outside of the core layer (i=1) are connected to exactly one core ancestor (i.e. $c_i=1$ everywhere). This heavily contributes to the emergent properties of Mandala networks:
  Having a mean shortest path length that asymptotes to a constant as the network size ($N=\Sigma_i n_i$) increases.
  Becoming highly sparse as the network size ($N=\Sigma_i n_i$) increases.
  Robust against random node failures.

A characteristic of a BLN is that all non-core nodes connect to at least one ancestor. However, the BLN definition accommodates non-core nodes having up to m connections to core ancestors (i.e. $1 \le c_i \le m$ everywhere). The reason for the generalisation from $c_i=1$ to $1 \le c_i \le m$ throughout a BLN can be understood as an artefact of the blockchain protocol. The protocol that defines a blockchain system relies on a probabilistic security model. In essence, this means that any participant (node) in a BLN with a vested interest in an event being recorded on the blockchain 150 must take into account the probabilistic security model by connecting to a minimum fraction f of network hashing power, where 100% of total hashing power is distributed amongst the nodes in the core layer of the BLN. Assuming that the core layer exhibits a uniform equilibrium distribution of hash power amongst its $n_1$ core nodes, then the minimum fraction of nodes is:

$$f=m/n_1$$

The blockchain protocol indicates that the lower bound for the minimum fraction is f=0.51, but the network participants of a BLN at scale may demand a higher fraction (e.g. f=0.67) than this for increased resilience (e.g. to double-spending). A BLN may be characterised by the choice of the parameter m, as this dictates the probabilistic security of operations for participants within the BLN, which will depend on the particular use case of needs of the BLN in question.

Nodes in the second layer $L_2$, being closest to the core, are most strongly dependent on the probabilistic security model of the blockchain protocol, and this dependency may decrease in layers approaching $L_g$. The connection protocol may require nodes in $L_2$ to connect to exactly $c_2$=m core ancestors, while nodes in all successive layers i>2 may connect to anywhere in the range $1 \ll c_i \le m$ of core ancestors. In some examples, nodes is all successive layers must connect to m core ancestors.

Nodes outside the central core of a BLN may have an 'SPV-like' connection to the core. This means that they can do the following.
 a) Send a transaction to a core node
 b) Ask a core node if a transaction has been accepted in its mempool/candidate block
 c) Ask for the Merkle proof of a transaction that has been mined in a block
 d) Ask for an up-to-date list of block headers These simple, targeted requests are designed to put as little burden on the core nodes 301 as possible whilst allowing for the widest possible range of scalable solutions to be built on top using a BLN. Many use-cases will require no more that the type of connection described above. In some examples, the second nodes 302 and/or outer nodes 303 are configured such that they can only perform actions a) to d) above. However, other solutions, typically enterprise level, may require the core to actively serve them more data, such as transactions that satisfy specific criteria. Therefore actions a) to d) are a minimum requirement for a BLN but additional data transfer between those nodes and the core is also possible in some examples.

For nodes operating smart contracts, some may only need SPV-like actions a) to d), whilst others may require agreements put it place to receive more data from core nodes.

In some BLNs, users may operate nodes of layer 3 or higher, and a smart contract may be operated by nodes of layer 2 or higher. Users cannot practically 'listen' to the blockchain for a transaction with a particular output address on a continual basis as to do so would require constant monitoring of the blockchain 150 for transactions including the particular address.

Given the number of transactions that can be transmitted to the blockchain per period of time is continuing to increase, such constant monitoring is not practical for an end user. Although it is common amongst the wallet architectural of some blockchains to constantly monitor the blockchain, it is not a scalable solution given that both the number of transactions submitted to the blockchain per period of time, and the number of users of the blockchain, are expected to increase dramatically in the future. Consider the following example: Alice would like to pay Bob. She creates a transaction for the desired amount with an output address that she knows belongs to Bob. Alice then submits this transaction to the mining network, and not directly to Bob. In order for Bob to know that the transaction has been accepted he must 'listen' to the blockchain to see if and when a transaction with his output address has appeared on the network. He must ask a mining node to do this on his behalf. This means that a mining node has to keep a record of Bob's address and check whether every transaction it receives matches this address. Note that there is no economic incentive for a miner to do this. Assuming that a miner must process a million transactions per second and must check whether they match a million addresses shows that this quickly becomes unrealistic.

Instead, in a BLN, Alice may be directly connected to Bob and can send him the transaction directly. Bob can then send the transaction to miners in the core and at the same time ask if they accept the transaction as valid. Miners are incentivised to accept the transaction as it contains their fee, and they are incentivised to confirm whether they have accepted the transaction so that they lower the risk of constructing a block that will be orphaned. In order to make the system even more secure, Alice may send Bob the Merkle proofs of the inputs to her transactions. Bob may check these Merkle proofs as he has a copy of the block headers. This ensures Bob that Alice's inputs were part of the blockchain 150 at one point, and if she has spent them already then Bob will have proof of the double spend as he has received signatures from Alice in the transaction that she has given him. Note that Bob may be a smart contract (second node) and Alice may be a user (outer node) who would like to interact with that smart contract. If the smart contract is 'light' in the sense that the smart contract operator has not made any specific agreement with a mining node to facilitate the processing of the smart contract, then it too cannot rely on listening to the blockchain 150 in order to receive a transaction that triggers a change in state. Alice must send such a transaction directly to the smart contract.

A service provider may operate a node in layer 2 or higher. The case of a service provider is different from that of a user or lightweight smart contract. A service provider may have a commercial agreement with a core mining node, or collection of core nodes, who then propagate a certain subset of transactions to the service provider nodes. Such transactions should be easily identifiable and satisfy specific criteria, for example:
 OP_RETURN data with a specific protocol flag. For example, the Meta net protocol, the Tokenized protocol, or a digital certificate protocol.
 Output addresses matching a small, specific set. For example, enterprise-level smart contracts or address whitelists/blacklists.
 A secondary consensus ruleset indicated by an OP_VER control branch.

In addition, transactions sent to the core that follow these rules, or are in other ways identified as part of the community engaged in the service-level agreement, may have lower (or even zero) transaction fees. The shortfall may be made up by a higher transaction volume or by revenue in fiat from the service-level agreement.

All nodes of the BLN 300 may be associated with a semi-permanent public key associated with their identity. This public key can allow for secure communication and provide a link to public keys used in blockchain transactions, either through a deterministic derivation of the identity key, or by signing or encrypting the transaction keys using the identity key.

Two ways of identifying mining core nodes are:
1) Miner ID. Miners may elect to identify themselves by adding their identity key to the input of the coinbase transaction in each block that they mine.
2) Network analysis. Some miners choose to remain anonymous. However, it is still possible to identify which nodes are constructing blocks by analysis of the network, for example by looking at where the new blocks originate from.

It is important that nodes of a BLN are able to identify both types of miners so that they can poll as many miners as possible as to whether their transactions have been accepted. Core nodes that have a Miner ID are able to issue digital certificates to layer 2 nodes. This may be because they have a service level agreement with these nodes, or it may be because these nodes have requested a certificate for a fee. In this sense core nodes can act as a Certificate Authority (CA).

With or without a certificate from a core node, a layer 2 node may seek an external CA to issue them a digital certificate. Therefore, each layer 2 node may have at least one digital certificate attesting to their identity. They may issue certificates to other nodes in layer 2 thereby creating a web of trust between them. Nodes in layer 2 may issue certificates to nodes in layer 3, and nodes in layer 3 may issue certificates to nodes in layer 4, and so on, creating a hierarchy of certificates referred to as a Public Key Infrastructure (PKI).

In fact, such a PKI can be used not just for the identification of nodes in a BLN, but ensuring that the correct BLN structure is adhered to. For example, if a layer 3 node issues certificates to too many layer 4 nodes, or does not ensure that they have the appropriate connections to others nodes in the system, then the certificate of the layer 3 node may be revoked. These certificates themselves may be stored on the blockchain 150. This makes the PKI transparent and easily auditable.

Ordering and Timestamping

There may be a number of applications that can be implemented using a blockchain where the order of the application data matters. To address this, according to embodiments of the present disclosure, one or more nodes of a network may be configured to act as an attestation service to arbitrate between different items of data submitted to the service in order to determine a definitive order of the data items, and then have that order recorded immutably on a blockchain.

The attestation service is implemented at one or more attestation nodes. In embodiments these are nodes of an overlay network overlaid on an underlying infrastructure network such as the Internet. However it is not excluded that alternatively they could be infrastructure nodes of a network in their own right, e.g. a private network within an organization. Either way, the one or more attestation nodes are arranged to receive items of data from one or more client nodes, to form transactions recording the order of the received data items, and to forward these transactions on to one or more core nodes for recordal on a blockchain 150. The core nodes are nodes 104 of the blockchain network 106. They may comprise mining nodes 104M, storage nodes 104S, or a combination thereof. In embodiments each of the core nodes is a mining node 104M and/or storage node 104S (e.g. full copy node).

Each of the client nodes may be an end-user node, comprising the computer equipment of a user of the service. This could be an individual user or an organization such as a company, academic institution, or government institution, etc. Hence each client node may comprise one or more user terminals and/or a server comprising one or more server units at one or more sites. Each client node comprises memory comprising one or more memory units, and processing apparatus comprising one or more processing units. These may for example take any of the forms of memory medium and/or processor as those discussed previously in relation to other network elements or user equipment. The memory stores client software arranged to run on the processing apparatus, wherein the client software is configured so as when run to operate the node as a client of the attestation service provided by the attestation node(s) in accordance with any of the following embodiments or similar. Optionally, one or more of the transmitting end-user nodes may comprise the user equipment 103 of a user 102 of the blockchain network 106, and the client software may comprise a blockchain wallet application 105 or the like. However the attestation service may be arranged to formulate at least some transactions on behalf of such end-users, rather than all such transactions necessarily being formulated at the wallet 105 of the user.

The attestation nodes are arranged to provide an attestation service mediating between the client nodes and the core nodes. Each attestation node may take the form of a server comprising one or more physical server units. Each such node comprises memory comprising one or more memory units and processing apparatus comprising one or more processing units. These may for example take any of the forms of memory medium and/or processor as those discussed previously in relation to other network elements. The memory stores attestation service software arranged to run on the processing apparatus of the attestation node. This software is configured so as when run to provide an attestation service that operates in accordance with any of the embodiments described below or similar. In embodiments, the identity of each attestation node may be certified by a certificate authority, to enable the client nodes, core nodes and/or other attestation service nodes to verify the identity of the attestation node. The identity of each client node may be certified by a certificate authority, to enable the attestation service nodes, core nodes and/or other client nodes to verify the identity of the client node. Interaction between such nodes for the purpose of providing or using the attestation service may be conditional on the verification. Alternatively or additionally, node versioning may be used as an alternative mechanism for node identification in an overlay network.

Figure 7:
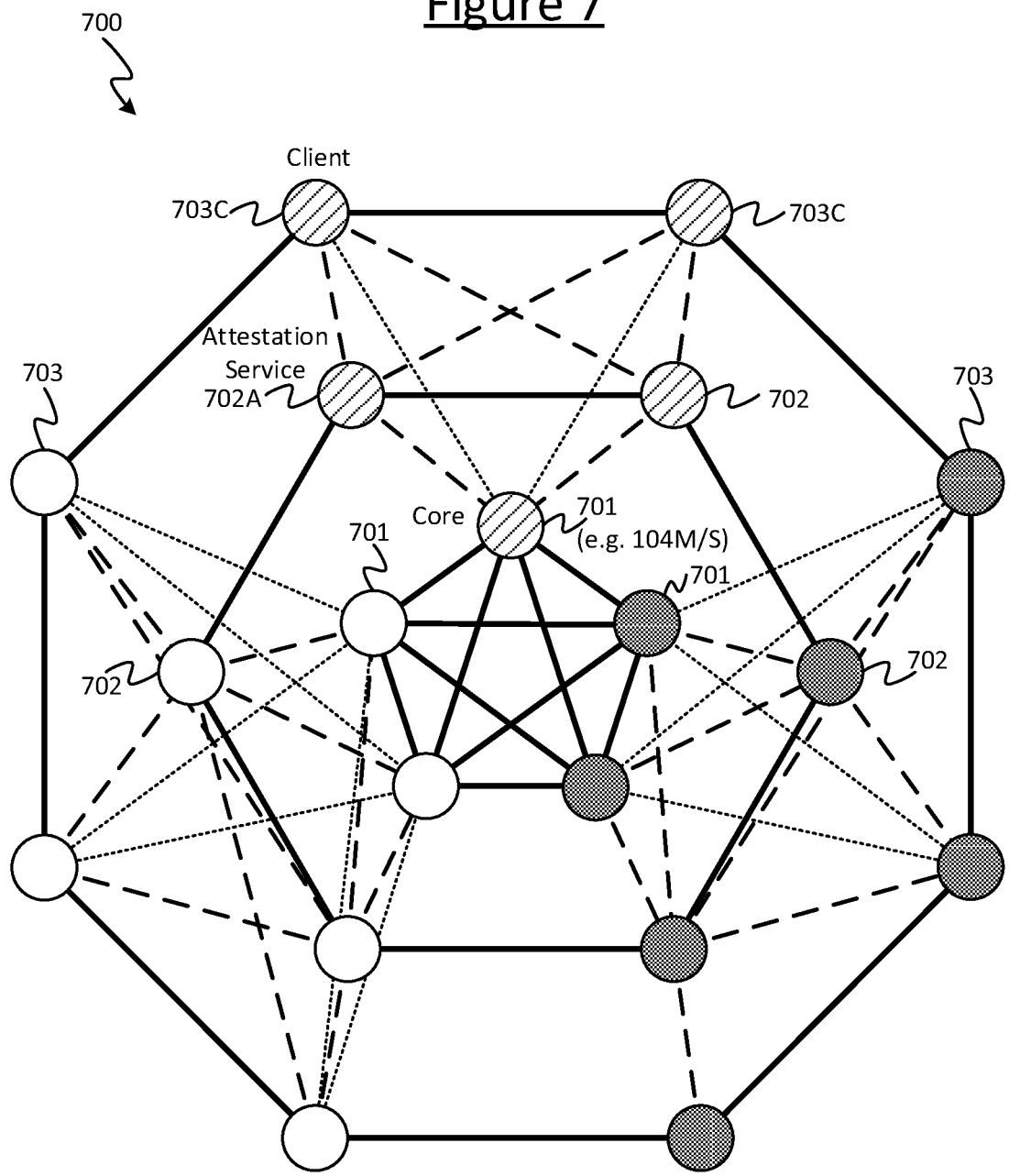

In embodiments the above arrangement may be implemented in the form a layered network 700, such as of the type described in relation to FIGS. 3 to 6, and as also illustrated in FIG. 7 by way of example. That is, the layered network comprises: a core network comprising the core nodes 701; at least one intermediate layer around the core, each intermediate layer comprising one or more intermediate layer nodes 702; and at least one outer layer around the outermost of the intermediate layers, each outer layer comprising one or more outer layer nodes 703. Note that the term "outer" in "outer layer" here does not in itself necessarily limit to the outermost layer of the layered network 700 as a whole, though that is one possibility. In embodiments the layered network 700 of FIG. 7 may be the layered network 300 of FIG. 3, in which case the outer layer nodes of FIG. 7 are the third layer nodes of FIG. 3 or 4, the intermediate layer nodes 702 of FIG. 7 are the second layer nodes 302 of FIG. 3 or 4, and the core nodes 701 of FIG. 7 may be the core nodes 301 of FIG. 3 or 4.

As discussed in relation to FIGS. 3 to 6, the layered network 700 may be an overlay network overlaid on an underlying physical or infrastructure network such as the Internet. In such embodiments the nodes 701, 702, 703 are configured to form connections between one another at the overlay network level. That is, the nodes 701, 702, 703 of the layered network are configured to obey an overlay network protocol which specifies what connections they can and cannot form with other nodes 701, 702, 703 of the layered network. Hence, although all the nodes may be physically capable of connecting to one another via the underlying infrastructure (e.g. the internet), when they are participating as nodes 701, 702, 703 of the layered network, operating in accordance with the relevant overlay network protocol of the layered network 700, then the connections between such nodes 701, 702, 703 may be more limited. A connection between two nodes 701/702/703 of the layered network 700 means those nodes can communicate directly, which in this context means without having to perform a hop via another node 701/702/703 of the layered network 700. In the context of an overlay network, a "connection" means a connection (i.e. edge) at the level of the overlay network (i.e. the level of the overlay network protocol of the layered network).

Each intermediate layer node 702 is connected to at least one core node 701 (blockchain network node 104) in the core network. The core network comprises at least part of the blockchain network 106. In embodiments the core network, in itself, may be a complete network.

In some cases, some of the intermediate layer nodes 702 and/or outer layer nodes 703 may comprise periphery nodes 104 of the block chain network 106, e.g. nodes other than mining nodes 104M and/or storage nodes 104S such as forwarding nodes 104F. Alternatively, they may comprise nodes that do not have any role in the blockchain network 106 (mining, storage or forwarding) other than as clients of the blockchain network 106.

Each outer layer node 703 is connected to at least one of the intermediate layer nodes in at least one intermediate layer. In embodiments each outer layer node 703 also has at least one connection to at least one core node 701 (i.e. to the blockchain network 106). In some such embodiments, one or more of the outer layer nodes 703 each have connections to more than one—but not all—of the core nodes 701. In embodiments the layered network 700 as a whole may be a non-complete network, i.e. not every node 701, 702, 703 has a connection to every other at the overlay network level. In embodiments each node within a given layer may be connected to at least one other node in the same layer. E.g. each node 702 in an intermediate layer may be connected to one or more others in the same intermediate layer, and/or each node 703 in an outer layer may be connected to one or more others in the same outer layer. In embodiments connections may also be formed between different intermediate layer nodes 702 in different intermediate layers, and/or different outer layer nodes 703 in different outer layers.

In embodiments, the layered network 700 may be configured in accordance with any of the protocol rules or structural features described in relation to FIGS. 3 to 6; where each intermediate layer of intermediate nodes 702 is a layer between the core and the outermost layer, and each outer layer of outer nodes 703 is a layer outside of the second layer (with the intermediate layer(s) being between the core and the outer layer(s)).

Embodiments below will be exemplified in the context of a layered network, but it will be appreciated that this is not limiting, and more generally the attesting node(s) could be any node of any type of overlay network which mediate between one or more client nodes and one or more core nodes 104 of the blockchain network 106.

In the implementation in a layered network 700, at least one of the intermediate nodes 702 in at least one intermediate layer takes the role of an attestation node 702A providing the attestation service. At least one of the outer nodes 703 in the outer layer in at least one outer layer is a client node 703C of the attestation service provided by the attestation node(s) 702A. Each core node 701 is one of the nodes 104 of the blockchain network 106, preferably a miner 104M and/or storage node 104S (e.g. full-copy node). Only two client nodes 703C and two attestation nodes 702A are shown in FIG. 7 for simplicity of illustration, but it will be appreciated that there may be more. In embodiments, the client nodes 703C and attestation nodes 702A may be part of the same community as one another.

The client nodes 703C are clients at least in that they are clients of the attestation service. In embodiments the client software run on one or more of the client nodes 703C may be further configured to operate its node 703C as a client of one or more additional services provided by one or more second layer nodes 702, e.g. a database service or smart-contract service. And/or, it may be configured to operate its node 703C as a client of one or more core nodes 701 (e.g. 104M, 104S) of the blockchain network 106, such as to be able to query the blockchain 150.

Also the fact that the client nodes 703C are described as clients of the attestation service (and optionally one or more other services) does not exclude the possibility that these nodes may themselves also be servers of one or more further services to one or more further entities (not shown). E.g. a client node 703C could comprise computer equipment of a company who provides online services to customers. "End-user" herein means an end-user of a particular service in question and does not necessarily limit to an individual consumer at the end of a commercial supply chain (though that is certainly one possibility as well).

The following describes a method in which an ordering service entity 702A may use the blockchain 150 to record the ordering and time in which data elements were received from one or more client nodes 703C. Optionally the ordering service may also perform timestamping.

The method is first described for a single trusted order-attestation node 702A. This may be modelled as a single intermediate layer (e.g. second layer) node in a layered network 700 with a core of blockchain network nodes 104/701. The users of this service will then be the users of outer layer (e.g. third layer) nodes 703C which are directly connected to the service 702A and optionally also the blockchain 150 (by means of a connection to at least one core node 701 in the core).

When data elements are received from client nodes 703C in the outer layer, the intermediate layer timestamping service 702A will gather them together in such a way that an order is established. When a certain time period has passed, for example 0.1 seconds, this ordered list of data elements is encapsulated in a transaction and sent to the blockchain 150 via the core 701, and thus recorded immutably. If a timestamp is added to the records then this also records time as well as order.

An example application is to define a definitive order amongst updates to entries in a database or such like. In this case each data item received from a client node 703C may represent a respective change of state (i.e. update) to an entry in the database. However such updates are not necessarily commutative—i.e. order matters. For example, if there are two requests to perform a non-commutative operation of a data element, e.g. matrix multiplication from the left, then the order is important. In another example, one request may be to delete a file and the other to read a file. Again, the order these requests are applied makes a difference to the result.

Another example application is to implement smart contracts in an output-based (e.g. UTXO-based) blockchain model. UTXO-based transactions or the like do not inherently support smart contracts in the same way that transactions of an account-based model do, so the smart contract functionality needs to be layered on top of the basic transaction model if smart contracts are to be implemented in an output-based model such as a UTXO-based model. In this case the data items to be recorded on the blockchain 150 may again represent changes in state, e.g. changes in ownership or such like. Again, the order matters, e.g. as it may affect whether an attempted assignment of ownership is valid.

Another example application is an ordering and time-stamping of digital certificates from a certificate authority (CA). Digital certificates are used to approve access rights or other electronic permissions and are used, for example, in the SSL/TLS and HTTPS security that underpins the internet. In 2011 a Dutch CA was compromised by an attacker thought to be operating from Iran. False certificates were issued for high-profile domains, and log files were tampered with on the CA's servers. Had these log files been stored on the blockchain, using an ordering and timestamping service as described below, it would not have been possible to change the log files due to the security provided by proof-of-work. It is worth noting that private keys in the company's HSMs were compromised in the attack. This highlights the fact that one cannot always appeal solely to classical cryptographic protocols to ensure information security, and it may be beneficial also to rely on other mechanisms, such as proof-of-work, to make such attacks prohibitively onerous.

In operation, the attestation node 702A is arranged to receive a plurality of data items from one or more client nodes 703C, over the overlay network connections between the intermediate and outer layers. The data items may be labelled herein D by way of arbitrary terminology. The plurality of data items in question may be received from the same client node 703C or different client nodes 703C, or some from the same client node 703C and some from different client nodes 703C. They may be received directly via a connection between the client node 703C and the attestation node 702A, or may be forwarded via one or more other nodes of the layered network in between (i.e. may be received via more than one hop between the transmitting client node 703C and attesting node 702A).

The attestation node 702A is configured to determine an order of the plurality of data items D, thus determining a sequence of the plurality of data items. In embodiments the determined order is the order of receipt of the data items at the attestation node 702A. However it is not excluded that some other arbitration rule could be applied. For example if the data items are stamped with a time of transmission or creation by the client node(s) 703C that transmitted them, and the attestation node 702A trusts these client nodes, then the order could be the reported time of transmission or creation rather than the time of receipt. As another example the order could be dependent on a priority scheme that gives different weightings to different data items.

Whatever the determined order, the attestation node 702A attests to this order by creating a series of blockchain transactions 152 for recordal on the blockchain 150. The attesting node 702A generates a series of two or more such transactions, which may be labelled herein $Tx_0$, $Tx_1$, $Tx_2$ . . . by way of arbitrary terminology. The attestation node 702A includes an indication of a different set of one or more of the data items D in a payload of each successive one of the transactions Tx in the series. The payload may be comprised in an unspendable output of the respective transaction. Such an output may be made unspendable by means of an opcode that terminates the locking script of that output, e.g. OP_RETURN. However in other transaction protocols payloads may be included in other ways. The set of one or more data items indicated in each successive transaction comes after the set indicated in the transaction immediately preceding that transaction in the series of transactions, according to the order of data items determined by the attestation node 702A. I.e. the order of the transactions in the series matches the order of the sets in the determined sequence of data items.

The attestation node 702A creates, or otherwise determines, a corresponding series of public/private keypairs for the series of transactions:

$P_1, P_2, P_3, \ldots$

The attestation node 702A uses the private key of each keypair to sign the corresponding transaction in the series of transactions:

$Tx_0 \rightarrow Tx_1 \rightarrow Tx_2 \rightarrow Tx_3 \rightarrow \ldots$

Transaction $Tx_1$ contains the signature of $P_1$ in the unlocking script in its input, and transaction $Tx_2$ contains the signature of $P_2$ etc. Each transaction also contains a payload, e.g. in an OP_RETURN field, that includes the indication of the set of one or more data items D attested to by the respective transaction. This payload is signed over by each signature (in embodiments employing the Script language, the appropriate SIGHASH flag may be used). The initial funding transaction $Tx_0$ is constructed such that it can be unlocked by a signature of $P_1$. It may have an outpoint 0 with a dust value. By way of example, $Tx_1$ may be constructed as shown in FIG. 8. All subsequent transactions have the same structure. I.e. $Tx_2$ contains a signature using $P_2$ in an input pointing to $Tx_1$ to unlock $Tx_1$, and has a locking script in an output which can be unlocked by a signature of $P_3$, etc. The signatures can be verified by the blockchain network 106 based on the corresponding public keys of the key pairs. The funding transaction $Tx_0$ may or may not include an indication of the first set of data item (the first set of data items in the sequence could be indicated in $Tx_0$ or $Tx_1$).

Note: the form shown in FIG. 8 ignores transactions fees for simplicity. This can be accounted for by adding another input and output to the transaction (e.g. administrated by attestation service).

The OP_RETURN statement contains a payload called $data_1$. This contains the data elements D, or an indication thereof, submitted by the users in an order attested to by the attestation service amongst the set attested to by $Tx_1$. (and similarly for $data_2$ in $Tx_2$, etc.). Since each transaction signs the hash of the previous transaction, this also implies an ordering of the payloads $data_1$, $data_2$, $data_3$ and so on.

A blockchain transaction cannot feasibly be double spent once it is accepted by the blockchain network 106. It also acts as a form of publishing for the order attested to the attestation service provided by the attesting node 702A. This gives confidence to a user of a client node 703 that the position in which their data element appears in order attested to by this attestation authority cannot be retrospectively altered. Once such a transaction is mined in a block 151 it becomes even more unlikely that the order will be altered as it is computationally expensive to replace an existing block.

In some embodiments the set indicated in each transaction $Tx_0, Tx_1, Tx_2 \ldots$ consists of only a single one of the data items D per transaction (i.e. each data payload indicates only a single respective D). Alternatively the set indicated in each such transaction may comprise multiple data items D per transaction (each data payload indicates a different respective set of multiple different data items D). In the latter case, the payload information also specifies the order of the data items D within the local set of the respective transaction. This may be achieved for example by means of an ordered list included in the payload (e.g. OP_RETURN output), and/or an index indicating the order mapped to the indication of each D. Examples are shown in FIGS. 9 to 11, to be discussed in more detail shortly.

When multiple data items D are indicated per transaction, some basis is required to determine which data items are to be gathered together per transaction. In principle any scheme could be used for dividing up the data items between transactions, but in embodiments this may be done based on regular time intervals. I.e. all data items D received by the attestation node 702A within a first instance of the regular time interval are included in a first transaction in the series, then all data items D received in the next instance of the regular time interval are indicated in the next transaction in the series, etc.

The exact timing of the interval between transactions may be configured by the implementation. For example, transactions may be submitted at intervals of 0.1 seconds.

The respective set of data items may be indicated in a transaction simply by including the data item(s) of that set explicitly ("in-the-clear") in the payload of the respective transaction Tx. Alternatively or additionally, they may be indicated in a transformed form such as a hash, encrypted form, or an r-puzzle. Examples will be discussed in more detail in relation to FIGS. 9 to 11. In the context of an ordering attestation service, as a minimum an "indication" of data items herein means some information enabling a querying node inspecting the transactions to verify the attested order of the data items. In some cases where the explicit values of the data items D are not included explicitly in the transactions, this may require that the querying node has predetermined knowledge of the values of the data items D, and is merely inspecting the transactions on-chain or in the mempools 154 of blockchain nodes 104 to confirm an expected order of those items.

In embodiments, the attestation node 702A may also include at least one timestamp in the payload of each transaction $Tx_0, Tx_1, Tx_2 \ldots$ in the series. The timestamp indicates a time at which the respective data item(s) were received at the attesting node 702A. In the case of a single data item D per transaction, this may simply be the time of receipt of that data item. In the case of multiple data items D per transaction Tx, each transaction payload could include a single timestamp indicating a time of arrival for the set (e.g. the time interval in which they were received), or an individual timestamp per data item D in the set.

When the attestation service submits a transaction containing a user's data to the blockchain 150, in some embodiments it will also send this transaction to the client node(s) 703 which submitted the data items D. This is possible since the user in an outer layer (e.g. layer 3) is directly connected to the attestation node 702A in an intermediate (e.g. layer 2). Since in embodiments the client node 703 is also directly connect to the blockchain mining nodes 104M and/or storage nodes 104S in the core, it may check independently that the transactions $Tx_0, Tx_1, Tx_2 \ldots$ have been accepted by the blockchain network 106. The client node 703A can thus query the mempools 154 of the miners 104M, and/or the actual blockchain 150 record on the storage nodes 104S, in order to confirm that the expected order has been attested to. Other third-party nodes may also verify this in a similar manner via any suitable connection the blockchain network 106. In some embodiments, the query by a client node 703A may be performed via a connection between the client node 703C and the core using only the SPV-like connectivity discussed previously in relation to FIGS. 3 to 6.

Optionally, the attestation service may also send the client node(s) 703C that submitted the data items a chain of transactions preceding the transaction containing their data. This is so that the users can be sure that there are not two competing chains of transactions with different orders that have been submitted to the blockchain by the service. The length of the chain of transactions should be appropriate for the level of trust required by the user. This trust may be outsourced: for example a certificate authority may certify the accuracy of the chain of transactions every hour.

In embodiments, client nodes 703C within a layer may also be connected to one another and can send each other (mined) transactions containing their and the corresponding Merkle proofs. Since in embodiments each outer layer (e.g. layer 3) node is independently connected to the blockchain 150, then they can verify that the Merkle proofs are correct. This allows users in an outer layer (e.g. layer 3) to agree upon an ordering of the data with only a minimal amount of temporary trust in the timestamping service, before trust in the proof-of-work on the blockchain takes over.

The following will now explore the OP_RETURN payload $data_1$ in more detail. The goal is for the service to attest to an order in which the data elements $D_1, D_2, D_3, \ldots$ were received in the time interval. Note that the data elements may represent hash commits of the data relevant to each user. It may be up to the user's discretion whether they choose to publicize their data or instead to record a hash commit of their data.

There are a few different ways the set of data items D and their relative order can be indicated within a transaction Tx. The simplest is to just index each element and since the OP_RETURN is signed over then this is attested to by the timestamping service. However, there are smarter ways to do this that provide additional evidence of ordering and allow for generalisations to distributed timestamping services.

METHOD 1.1: HASH CHAIN. A unique index i is assigned to each data element $D_i$ and an entry $H_i$ in a hash chain is created. The value of $H_i$ is dependent on the data element and the previous element of the hash chain. This means that each element of the hash chain must have been created after the previous element, enforcing an order. An example of the hash chain is shown in the table of FIG. 9. This table would be included in the payload (data) of the transaction, optionally with or without the explicit D column being included in the transaction.

One advantage if the values of D are not explicitly included is that the hash may be smaller than D, and hence this requires fewer bits to be stored on chain. Also it means that the actual values of D do not need to be published if the user does not want to make them public. Either way, whether the D values are explicitly included or not, another advantage of the hash chain is that it makes the order harder to change. Say there are 1000 data items D per transaction by way of illustration. Then to re-order these data items would require 1000 hashes to be performed, which would be computationally onerous. Thus even if the attestation node 702A is not completely trusted, this gives the user additional confidence that the data items have not been re-ordered.

In some embodiments, an attestation of a timestamp $t_i$ of the receipt of each data element $D_i$ may also be included. One way to do this is to include a timestamp in the preimage of each element of the hash chain, e.g.:

$$H_1'=H(D_1\|t_1), H_2'=H(D_2\|t_2\|H_1'), \text{etc.}$$

In this case a column containing the time will also be added to the table of FIG. 9.

The OP_RETURN payload $data_1$ is made up of the table such as shown in FIG. 9. The column 'Data' may be omitted to save space or to keep the data elements private. Although note that in that case, the only way for someone to prove the order of the hash chain is for all data elements to be known.

Additional security may be provided by replacing the hash functions with an HMAC. An HMAC is described in RFC 2104 and introduces a secret symmetric key to the hashing procedure. This means that only those with the knowledge of the secret key may be able to prove the order of the data.

METHOD 1.2: HASH CHAIN WITH MERKLE TREE. This case is similar to the hash chain of FIG. 9, but instead of publishing the entire hash chain, it is turned into a Merkle tree and just the root is published. In this case each data item D in the set is modelled as a leaf of the Merkle tree, and the Merkle root is included as the indication in the transaction. Note that an index of the data is implied by the order in which it appears in the leaves of the Merkle tree. A Merkle proof could be provided later to a user to allow the user to check the presence of a data item and its position in the Merkle tree. This method saves space in the transactions as only 256 bits are required in the OP_RETURN payload for the Merkle root.

Additionally or alternatively, each data item may be indicated in the transaction by a corresponding merkle proof for that leaf. As will be familiar to a person skilled in the art, a Merkle tree allows one to prove that a given data item is a member of a set, given the merkle root and the merkle proof for the data item (which is the chain of hashes between the root and the leaf).

METHOD 2.1: CHAIN OF SIGNATURES. In this method, a new public key is created for each data element D, and that element is signed with the new public key. This is aligned with the requirements in the timestamping protocol outlined in RFC 3161.

Consider the sequence of public keys and signatures shown in FIG. 10. The idea is that each public key is generated based on the preceding data. Similar to the hash chain, each public key (and therefore signature) in the sequence can only be created with the knowledge of the previous public key in the sequence, thus enforcing an order.

In a variant of this method, the entries in the table could each be transactions in their own right.

METHOD 2.2: CHAIN OF r-PUZZLES. An R-puzzle is a recently disclosed form of challenge and proof. It is based in the r-part of an ECDSA signature (S, R), and provides a way to prove knowledge of a secret without revealing that secret. See and www.youtube.com/watch!v=9EHKvNuRc0A&t=978s
and
www.youtube.com/watch!v=CqqTCsLzbEA.

An ECDSA (elliptic curve digital signature algorithm) signature consists of the combination (S,R) where R is the x-coordinate of the public part of the ephemeral keypair. It is possible to use the same public key for each signature but chain together the ephemeral keys. This would give the sequence shown in FIG. 11. This may be included in the transaction payload (data) either as an alternative to, or in addition to, any of the above methods.

Here $R_1$ is a random ephemeral key and $<S_1, R_{i1}>(H(D_i))$ means the data $H(D_i)$ signed with $P_1$ using ephemeral key $R_{1i}$.

In general any of methods 1.1, 1.2, 2.2 and/or 2.2, and/or others, may be used individually or in conjunction to indicate the order amongst a set of data items D in the payload (data) of a transaction.

DISTRIBUTED CASE: The above has been described in a scenario where the order-attestation service is provided by an individual node 702A. It is also possible to provide such a service through multiple attestation nodes 702A.

Consider for example a situation with a distributed attestation service that uses a layered network 700 to achieve consensus. In this case more than one of the intermediate layer nodes 702 (e.g. layer 2 nodes) in FIG. 7 will take the role of attestation nodes.

Assume that the majority of attestation nodes 702A act honestly and would like to achieve a consensus for ordering and timestamping of the data propagated around a community (as defined earlier) that is made up of the attestation service nodes 702A and the users 703C. Assume that there are N independent attestation service nodes 703A that are connected to the same subset of m core mining nodes 701 and therefore define a community of the layered network 700. The fact that there are multiple intermediate layer (e.g. layer 2) attestation nodes 702A allows for many users in the outer layer(s) (e.g. layer 3) to connect to a node 702 in an intermediate layer (e.g. layer 2) without the load being too high (too many connections) for the intermediate layer nodes.

The issue to address then, in such as distributed case, is how the intermediate-layer attestation nodes 702A (e.g. layer 2 nodes) can agree to a consensus in the ordering of, for example, two data items $D_1$, $D_2$ submitted by two users even if they arrive in a different order at one attestation node 702A compared to another.

One method for addressing this is to use threshold signatures, i.e. where at least M different signatures (M>1) are needed to unlock a transaction Tx rather than just one, as discussed previously. Consider an M-of-N threshold signature system as described applied to the attestation service nodes 702A. This means that there are N participating nodes with private keyshares $a_1, a_2, \ldots, a_N$. Any subgroup of M participants can produce signature shares that combine to give a signature of a message that will unlock the preceding transaction in the series.

Suppose one of the attestation service nodes 702A produces a candidate transaction $Tx_1$ containing the OP_REUTRN payload $data_1$ that is an ordered list of all data elements D it has received in the chosen time period. This node may broadcast the candidate transaction to all other attestation service nodes 702A (or at least some of them) and ask for their signature shares to sign the transaction. If they receive at least M signature shares (including their own) then the transaction may be submitted to the blockchain network 106 and mined into a block 151. This ensures that an ordering of the data elements is agreed by at least M-of-N timestamping services in the distributed network.

How is a single attestation node 702A chosen to create at transaction? The above has assumed that there is just one attestation service node 702A that has created a candidate transaction $Tx_1$ and that the other attestation nodes 702A are OK with this. But what about the next candidate transaction? There are at least two options: (i) there is always one privileged attestation node 702A that creates candidate transactions, or (ii) after each transaction is created then one of the attestation nodes 702A is chosen at random to be the next node to create the next transaction. This could be a random sequence determined in advance, or it could be a deterministically random choice based a seed relating to the transaction $Tx_1$ that has just been submitted. For example, the seed may be taken to be the $Tx_1$. Other distributed arbitration algorithms for distributed computing may also be possible.

CONCLUSION

It will be appreciated that the above embodiments have been described by way of example only. More generally, there may be provided a method, apparatus or program in accordance with any one or more of the following Statements.

Statement 1: a method of attesting to an order of a sequence of data items, the method comprising, at an attesting node of a network: receiving the sequence of data items from one or more client nodes of the network; determining an order of the sequence of data items, whereby each successive data item in said sequence succeeds a preceding one of the data items in the sequence; and based on said determination, attesting to the order by: including an indication of a respective set of one or more of the data items in each of a series of blockchain transactions, each successive transaction in said series succeeding a respective preceding transaction in the series, wherein the set indicated in each successive transaction succeeds the set indicated in the respective preceding transaction according to said order; wherein each successive transaction comprises a respective input pointing to an output of the respective preceding transaction, wherein the output of the respective preceding transaction comprises a locking script, and the input of the respective successive transaction includes an unlocking script comprising a respective signature based on a respective key in a series of keys, the inclusion of the respective signature being a condition for unlocking the unlocking script of the respective preceding transaction; wherein the respective signature in each successive transaction signs a portion of the respective successive transaction including at least the indication of the respective set of data items; and wherein the step of attesting to the order further comprises sending the transactions to be recorded on a blockchain.

Statement 2: the method of Statement 1, wherein said order is an order of receipt of the data items at the attesting node.

Alternatively the order could be an order according to some other arbitration rule, e.g. an order of transmission, or a priority order.

Statement 3: the method of Statement 1 or 2, wherein the step of attesting to the order further comprises: timestamping each of the transactions with timestamp information specifying at least one time of receipt of the respective set of data items, the time of receipt being the time of receipt at the attesting node.

Statement 4: the method of any preceding Statement, wherein each of said sets comprises a respective plurality of the data items, wherein the indication included in each transaction comprises an indication of each individual one of the data items in the respective set, and wherein said step of attesting to the order comprises: in each of said series of transactions, including information specifying the order of the data items within the respective set, from a first data item in the set through one or more successive data items in the set.

In embodiments, this information may be included in an unspendable output of the respective transaction. The unspendable output is made unspendable by inclusion of an opcode that terminates a script of the unspendable output. E.g. said opcode may be OP_RETURN.

Statement 5: the method of Statement 4, wherein said information comprises an index mapped to the indication of each individual data item in the respective set, and/or an ordered list of the individual data items in the set.

Statement 6: the method of Statement 4 or 5, wherein the plurality of data items of each respective set are selected on the basis of being received at the attesting node within a respective instance of a predetermined repeating time interval.

Statement 7: the method of Statement 4, 5 or 6, as dependent on Statement 3, wherein within each transaction: the timestamp information comprises an individual timestamp corresponding to each individual one of the data items in the respective set, specifying the time of receipt at the attesting node of the individual data item.

Statement 8: the method of any of Statements 4 to 7, wherein within each transaction: the indication of each individual data item comprises at least a hash; the indication of the first data item comprising a hash of a first preimage, wherein the first preimage comprises at least the first data item; and the indication of each successive data item succeeding the first data item comprising a hash of a respective successive preimage, wherein each successive preimage comprises at least the preceding hash in the sequence.

Statement 9: the method of Statement 8 as dependent on Statement 7, wherein each of the first and successive preimages further comprises the corresponding timestamp.

Statement 10: the method of any of Statements 4 to 9, wherein for each transaction, the individual data items are modelled as leaves of a Merkle tree, and the indication comprises one or both of: a Merkle root of the Merkle tree, and/or a merkle proof for each individual data item.

In some embodiments, the information specifying the order of the data items within the respective set comprises a merkle root of a merkle tree, wherein each leaf of the merkle tree comprises a respective hash of a preimage, wherein a first preimage comprises at least the first data item; and each successive leaf of the merkle tree comprises a hash of a respective successive preimage, wherein each successive preimage comprises at least the preceding hash in the sequence and the successive data item.

Statement 11: the method of any of Statements 4 to 10, wherein within each transaction: the indication of each individual data item comprises at least a corresponding public key, the indication of the first data item comprising a first public key generated based on the first data item, and the indication of each successive data item in the set comprising a successive public key generated based on that successive data item and the preceding public key in the sequence.

Statement 12: the method of Statement 11, wherein said signing comprises including a separate signature using each of the public keys, each signing a message comprising the corresponding data item or hash thereof.

Statement 13: the method of any of Statements 4 to 12, wherein within each transaction, the indication of each individual data item comprises an r-puzzle for the individual data item.

Statement 14: the method of any of Statements 4 to 13, wherein the indication of each data item comprises the respective data item in-the-clear.

Statement 15: the method of any of Statements 1 to 13, wherein each transaction does not include any of the data items in-the-clear.

In embodiments, at least some of the plurality of data items are received from the same client node. Alternatively or additionally, at least some of the plurality of data items are received from different client nodes.

Each data item may be received directly over a connection between the attesting node and the client node from which that data item is received. Alternatively a data item could be received vicariously via more than one hop, forwarded via one or more nodes of the network between the client node and the attesting node.

Statement 16: the method of any preceding Statement, wherein said network comprises a layered network including a core layer of core nodes, one or more intermediate layers each comprising a plurality of intermediate layer nodes, and one or more outer layers each comprising a plurality of outer layer nodes; wherein the core nodes comprise one or more nodes of a blockchain network.

In embodiments the core nodes comprise one or more mining nodes and/or storage nodes of the blockchain network. In embodiments each of the core nodes is a mining node and/or storage node (e.g. full-copy node) of the blockchain network.

Statement 17: the method of Statement 16, wherein the attesting node is one of the intermediate layer nodes.

Statement 18: the method of Statement 16 or 17, wherein the transmitting node, or at least one of the transmitting nodes, is one of the outer layer nodes.

Statement 19: the method of Statement 16, 17 or 18, wherein said sending comprises sending the transactions toward the core layer.

Statement 20: the method of Statement 19, wherein said sending comprises sending at least some of the transactions directly to at least one of the core nodes over a connection between the attestation node and the core node.

Statement 21: the method of Statement 19, wherein said sending comprises sending at least some of the transactions to one or more of the core nodes via a further one of the intermediate layer nodes.

Statement 22: the method of Statement 21, wherein the further intermediate layer node is configured to add its own signature to each of the transactions received from the attesting node, wherein each unlocking script in the series of transactions is conditional on the signature of more than one of the intermediate layer nodes to unlock.

In embodiments the further intermediate layer node may be in the same intermediate layer as the attesting node. Alternatively the further intermediate layer node may be in a different intermediate layer of the layered network, between the core layer and the layer of the attesting node.

Statement 23: the method of any preceding Statement, wherein the indication of each data item is included in an unspendable output of the respective transaction.

The unspendable output is made unspendable by inclusion of an opcode that terminates a script of the unspendable output. E.g. said opcode may be OP_RETURN.

Statement 24: the method of any preceding Statement, wherein the transactions and/or the attesting nodes are certified by a certificate authority.

Statement 25: computer equipment comprising: memory comprising one or more memory units, processing apparatus comprising one or more processing units, and a network interface comprising one or more network interface units; wherein the memory stores code arranged to run on the processing apparatus, the code being configured so as when run on the processing apparatus to operate the computer equipment as the attesting node by performing the method of any preceding Statement, including receiving the data items and sending the transactions via the network interface.

Statement 26: a computer program embodied on computer readable storage and configured so as when run on one or more processors to perform the method of any of Statements 1 to 24.

Statement 27: a method of determining whether a recorded order of a sequence of data items matches an expected order, the method comprising, at a client node of a network: determining the recorded order by reading an indication of a respective set of one or more of the data items from each of a series of transactions recorded on a blockchain, each successive transaction in said series succeeding a respective preceding transaction in the series; and for each successive transaction, checking that the one or more data items of the respective set indicated in the successive transaction succeed the one or more data items of the respective set indicated in the respective preceding transaction according to said expected order; wherein each successive transaction comprises a respective input pointing to an output of the respective preceding transaction, wherein the output of the respective preceding transaction comprises a locking script, and the input of the respective successive transaction includes an unlocking script comprising a respective signature based on a respective key in a series of keys, the inclusion of the respective signature being a condition for unlocking the unlocking script of the respective preceding transaction; and the method comprises verifying the signature in each successive transaction.

Statement 28: the method of Statement 27, wherein the client node previously transmitted at least one of the data items to an attesting node of the network, in order for the attesting node to attest to the recorded order by creating said series of transactions and sending them for recordal on the blockchain.

Statement 29: the method of Statement 27 or 28, wherein at least part of said network comprises a layered network including a core layer of core nodes, one or more intermediate layers each comprising a plurality of intermediate layer nodes, and one or more outer layers each comprising a plurality of outer layer nodes; wherein the core nodes comprise one or more nodes of a blockchain network, the client node is one of the outer layer nodes, and the attesting node is one of the intermediate later nodes.

Statement 30: the method of Statement 29, wherein the client node sends the at least one data item to the attesting node via a connection between the client node and one of the intermediate layers, but performs the reading via a direct connection between the client node and the core layer, where at least some of the nodes of the core layer maintain a copy of the blockchain.

Statement 31: computer equipment comprising: memory comprising one or more memory units, processing apparatus comprising one or more processing units, and a network interface comprising one or more network interface units; wherein the memory stores code arranged to run on the processing apparatus, the code being configured so as when run on the processing apparatus to operate the computer equipment as the querying node by performing the method of any of Statements 27 to 30, including reading said indications via the network interface.

Statement 32: a computer program embodied on computer readable storage and configured so as when run on one or more processors to perform the method of any of Statements 27 to 30.

Other variants or use cases of the disclosed techniques may become apparent to the person skilled in the art once given the disclosure herein. The scope of the disclosure is not limited by the described embodiments but only by the accompanying claims.

The invention claimed is:

1. A method of attesting to an order of a sequence of data items, the method comprising, at an attesting node of a network:
   receiving the sequence of data items from one or more client nodes of the network;
   determining an order of the sequence of data items, whereby each successive data item in said sequence succeeds a preceding one of the data items in the sequence; and
   based on said determination, attesting to the order by:
      including an indication of a respective set of one or more of the data items in each of a series of blockchain transactions, each successive transaction in said series succeeding a respective preceding transaction in the series, wherein the set indicated in each successive transaction succeeds the set indicated in the respective preceding transaction according to said order;
      wherein each successive transaction comprises a respective input pointing to an output of the respective preceding transaction, wherein the output of the respective preceding transaction comprises a locking script, and the input of the respective successive transaction includes an unlocking script comprising a respective signature based on a respective key in a series of keys, the inclusion of the respective signature being a condition for unlocking the unlocking script of the respective preceding transaction;
         wherein the respective signature in each successive transaction signs a portion of the respective successive transaction including at least the indication of the respective set of data items; and
         wherein the step of attesting to the order further comprises sending the transactions to be recorded on a blockchain.

2. The method of claim 1, wherein said order is an order of receipt of the data items at the attesting node.

3. The method of claim 1, wherein the step of attesting to the order further comprises:
   timestamping each of the transactions with timestamp information specifying at least one time of receipt of the respective set of data items, the time of receipt being the time of receipt at the attesting node.

4. The method of claim 1, wherein each of said sets comprises a respective plurality of the data items, wherein the indication included in each transaction comprises an indication of each individual one of the data items in the respective set, and wherein said step of attesting to the order comprises:
   in each of said series of transactions, including information specifying the order of the data items within the respective set, from a first data item in the set through one or more successive data items in the set.

5. The method of claim 4, wherein said information comprises an index mapped to the indication of each individual data item in the respective set, and/or an ordered list of the individual data items in the set.

6. The method of claim 4, wherein the plurality of data items of each respective set are selected on the basis of being received at the attesting node within a respective instance of a predetermined repeating time interval.

7. The method of claim 4, wherein the step of attesting to the order further comprises timestamping each of the transactions with timestamp information specifying at least one time of receipt of the respective set of data items, the time of receipt being the time of receipt at the attesting node; and wherein within each transaction:
   the timestamp information comprises an individual timestamp corresponding to each individual one of the data items in the respective set, specifying the time of receipt at the attesting node of the individual data item.

8. The method of claim 7, wherein:
   within each transaction, the indication of each individual data item comprises at least a hash; the indication of the first data item comprising a hash of a first preimage, wherein the first preimage comprises at least the first data item; and the indication of each successive data item succeeding the first data item comprising a hash of a respective successive preimage, wherein each successive preimage comprises at least a preceding hash in the sequence; and
   each of the first and successive preimages further comprises the corresponding timestamp.

9. The method of claim 4, wherein within each transaction:
   the indication of each individual data item comprises at least a hash; the indication of the first data item comprising a hash of a first preimage, wherein the first preimage comprises at least the first data item; and the indication of each successive data item succeeding the first data item comprising a hash of a respective successive preimage, wherein each successive preimage comprises at least a preceding hash in the sequence.

10. The method of claim 4, wherein for each transaction, the individual data items are modelled as leaves of a Merkle tree, and the indication comprises one or both of:
   a Merkle root of the Merkle tree, and/or
   a merkle proof for each individual data item.

11. The method of claim 4, wherein within each transaction:
   the indication of each individual data item comprises at least a corresponding public key, the indication of the first data item comprising a first public key generated based on the first data item, and the indication of each successive data item in the set comprising a successive public key generated based on that successive data item and a preceding public key in the sequence.

12. The method of claim 11, wherein said signing comprises including a separate signature using each of the public keys, each signing a message comprising the corresponding data item or hash thereof.

13. The method of claim 4, wherein within each transaction, the indication of each individual data item comprises an r-puzzle for the individual data item.

14. The method of claim 1, wherein said network comprises a layered network including a core layer of core nodes, one or more intermediate layers each comprising a plurality of intermediate layer nodes, and one or more outer layers each comprising a plurality of outer layer nodes; wherein the core nodes comprise one or more nodes of a blockchain network.

15. The method of claim 14, wherein the attesting node is one of the intermediate layer nodes.

16. The method of claim 14, wherein the transmitting node, or at least one of the transmitting nodes, is one of the outer layer nodes.

17. The method of claim 14, wherein said sending comprises sending the transactions toward the core layer.

18. The method of claim 17, wherein said sending comprises sending at least some of the transactions directly to at least one of the core nodes over a connection between the attestation node and the core node.

19. The method of claim 17, wherein said sending comprises sending at least some of the transactions to one or more of the core nodes via a further one of the intermediate layer nodes.

20. The method of claim 19, wherein the further intermediate layer node is configured to add its own signature to each of the transactions received from the attesting node, wherein each unlocking script in the series of transactions is conditional on the signature of more than one of the intermediate layer nodes to unlock.

21. Computer equipment, comprising:
memory comprising one or more memory units,
processing apparatus comprising one or more processing units, and
a network interface comprising one or more network interface units;
wherein the memory stores code arranged to run on the processing apparatus, the code being configured so as when run on the processing apparatus, the processing apparatus operates the computer equipment as an attesting node by performing a method of attesting to an order of a sequence of data items, the method comprising:
via the network interface, receiving the sequence of data items from one or more client nodes of the network;
determining an order of the sequence of data items, whereby each successive data item in said sequence succeeds a preceding one of the data items in the sequence; and
based on said determination, attesting to the order by:
including an indication of a respective set of one or more of the data items in each of a series of blockchain transactions, each successive transaction in said series succeeding a respective preceding transaction in the series, wherein the set indicated in each successive transaction succeeds the set indicated in the respective preceding transaction according to said order;
wherein each successive transaction comprises a respective input pointing to an output of the respective preceding transaction, wherein the output of the respective preceding transaction comprises a locking script, and the input of the respective successive transaction includes an unlocking script comprising a respective signature based on a respective key in a series of keys, the inclusion of the respective signature being a condition for unlocking the unlocking script of the respective preceding transaction;
wherein the respective signature in each successive transaction signs a portion of the respective successive transaction including at least the indication of the respective set of data items; and
wherein the step of attesting to the order further comprises, via the network interface, sending the transactions to be recorded on a blockchain.

22. A computer program embodied on non-transitory computer readable storage medium and configured so as when run on one or more processors, the one or more processor performs a method of attesting to an order of a sequence of data items, the method comprising:
receiving the sequence of data items from one or more client nodes of a network;
determining an order of the sequence of data items, whereby each successive data item in said sequence succeeds a preceding one of the data items in the sequence; and
based on said determination, attesting to the order by including an indication of a respective set of one or more of the data items in each of a series of blockchain transactions, each successive transaction in said series succeeding a respective preceding transaction in the series, wherein the set indicated in each successive transaction succeeds the set indicated in the respective preceding transaction according to said order;
wherein each successive transaction comprises a respective input pointing to an output of the respective preceding transaction, wherein the output of the respective preceding transaction comprises a locking script, and the input of the respective successive transaction includes an unlocking script comprising a respective signature based on a respective key in a series of keys, the inclusion of the respective signature being a condition for unlocking the unlocking script of the respective preceding transaction;
wherein the respective signature in each successive transaction signs a portion of the respective successive transaction including at least the indication of the respective set of data items; and
wherein the step of attesting to the order further comprises sending the transactions to be recorded on a blockchain.

23. A computer program product embodied on a non-transitory computer readable storage medium and configured so as when run on one or more processors at a client node of a network the one or more processors performs a method of determining whether a recorded order of a sequence of data items matches an expected order, the method including steps of:
determining the recorded order by reading an indication of a respective set of one or more of the data items from each of a series of transactions recorded on a blockchain, each successive transaction in said series succeeding a respective preceding transaction in the series; and
for each successive transaction, checking that the one or more data items of the respective set indicated in the successive transaction succeed the one or more data items of the respective set indicated in the respective preceding transaction according to said expected order;
wherein each successive transaction comprises a respective input pointing to an output of the respective preceding transaction, wherein the output of the respective preceding transaction comprises a locking script, and the input of the respective successive transaction includes an unlocking script comprising a respective signature based on a respective key in a series of keys, the inclusion of the respective signature being a condition for unlocking the unlocking script of the respective preceding transaction; and
the method comprises verifying the signature in each successive transaction.

\* \* \* \* \*